US012519248B2

(12) United States Patent
Choi et al.

(10) Patent No.: US 12,519,248 B2
(45) Date of Patent: Jan. 6, 2026

(54) ANTENNA STRUCTURE AND ELECTRONIC DEVICE COMPRISING SAME

(71) Applicant: SAMSUNG ELECTRONICS CO., LTD., Suwon-si (KR)

(72) Inventors: Seungho Choi, Suwon-si (KR); Yoongeon Kim, Suwon-si (KR); Seungtae Ko, Suwon-si (KR); Junsig Kum, Suwon-si (KR); Jungmin Park, Suwon-si (KR); Bumhee Lee, Suwon-si (KR); Youngju Lee, Suwon-si (KR); Jongmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 96 days.

(21) Appl. No.: 18/122,964

(22) Filed: Mar. 17, 2023

(65) Prior Publication Data

US 2023/0231321 A1 Jul. 20, 2023

Related U.S. Application Data

(63) Continuation of application No. PCT/KR2021/012824, filed on Sep. 17, 2021.

(30) Foreign Application Priority Data

Sep. 18, 2020 (KR) ........................ 10-2020-0120969

(51) Int. Cl.
*H01Q 21/06* (2006.01)
*H01Q 1/24* (2006.01)
(Continued)

(52) U.S. Cl.
CPC ........... *H01Q 21/065* (2013.01); *H01Q 1/246* (2013.01); *H01Q 1/48* (2013.01); *H04B 7/0413* (2013.01)

(58) Field of Classification Search
CPC .... H01Q 21/06; H01Q 21/061; H01Q 21/065; H01Q 1/246; H01Q 5/378; H01Q 9/0407; H01Q 9/0414; H01Q 9/0457
See application file for complete search history.

(56) References Cited

U.S. PATENT DOCUMENTS 6,211,824 B1 * 4/2001 Holden ................ H01Q 9/0414 343/846
6,407,704 B1 6/2002 Franey et al.
(Continued)

FOREIGN PATENT DOCUMENTS

CA 3 031 996 A1 2/2018
CN 206301944 U 7/2017
(Continued)

OTHER PUBLICATIONS

Communication dated Aug. 6, 2024, issued by the Korean Intellectual Property Office in Korean Patent Application No. 10-2020-0120969.
(Continued)

*Primary Examiner* — Jason M Crawford
(74) *Attorney, Agent, or Firm* — Sughrue Mion, PLLC

(57) ABSTRACT

The present disclosure relates to a $5^{th}$ generation (5G) or pre-5G communication system for supporting higher data transmission rates than $4^{th}$ generation (4G) communication systems such as Long-Term Evolution (LTE). According to one or more embodiments, an antenna includes: a first metal patch; a second metal patch; a feeding circuit; and a substrate. The first metal patch and the second metal patch are arranged on the substrate. The feeding circuit is coupled to the substrate and is spaced apart from the first metal patch.

10 Claims, 18 Drawing Sheets

(51) Int. Cl.

| | |
|---|---|
| ***H01Q 1/48*** | (2006.01) |
| ***H04B 7/0413*** | (2017.01) |

(56) References Cited

U.S. PATENT DOCUMENTS

| | | | | |
|---|---|---|---|---|
| 7,019,697 | B2 | 3/2006 | du Toit | |
| 7,277,056 | B1 * | 10/2007 | Thiam | H01Q 5/40 455/132 |
| 7,498,989 | B1 * | 3/2009 | Volman | H01Q 25/001 343/846 |
| 9,035,840 | B1 | 5/2015 | Lee | |
| 10,498,047 | B1 | 12/2019 | McGough et al. | |
| 10,804,606 | B2 * | 10/2020 | Foo | H01Q 9/0457 |
| 11,417,961 | B2 * | 8/2022 | Hautcoeur | H01Q 9/0485 |
| 11,695,219 | B2 * | 7/2023 | Govoni | H01Q 21/065 343/702 |
| 12,021,318 | B2 * | 6/2024 | Frank | H01Q 9/0414 |
| 2003/0214437 | A1 | 11/2003 | Rawnick et al. | |
| 2004/0263392 | A1 | 12/2004 | Bisiules | |
| 2005/0110686 | A1 | 5/2005 | Frederik du Toit | |
| 2008/0136734 | A1 * | 6/2008 | Manholm | H01Q 9/0435 343/893 |
| 2009/0058731 | A1 * | 3/2009 | Geary | H01Q 5/378 343/700 MS |
| 2011/0199279 | A1 | 8/2011 | Shen et al. | |
| 2015/0236424 | A1 | 8/2015 | Panther et al. | |
| 2015/0263431 | A1 * | 9/2015 | Moon | H01Q 21/26 343/730 |
| 2017/0125919 | A1 * | 5/2017 | Chien | H01Q 9/0414 |
| 2017/0264012 | A1 | 9/2017 | Clark et al. | |
| 2017/0271780 | A1 * | 9/2017 | Shen | H01Q 9/0457 |
| 2017/0352960 | A1 * | 12/2017 | Zhang | H05K 1/0221 |
| 2018/0166776 | A1 | 6/2018 | Ziegler et al. | |
| 2019/0020114 | A1 * | 1/2019 | Paulotto | H01Q 9/40 |
| 2019/0123443 | A1 * | 4/2019 | Russell | H01Q 1/22 |
| 2020/0073125 | A1 | 3/2020 | Kimura et al. | |
| 2020/0136257 | A1 | 4/2020 | Hwang | |
| 2020/0227831 | A1 | 7/2020 | Panther et al. | |
| 2020/0295470 | A1 | 9/2020 | Panther et al. | |
| 2020/0328518 | A1 * | 10/2020 | Park | H01Q 21/065 |
| 2020/0403322 | A1 * | 12/2020 | Ryu | H01Q 21/08 |
| 2023/0094039 | A1 * | 3/2023 | Park | H01Q 21/062 343/727 |
| 2023/0231321 | A1 * | 7/2023 | Choi | H01Q 5/378 343/893 |
| 2024/0162617 | A1 * | 5/2024 | Batra | H01Q 5/40 |

FOREIGN PATENT DOCUMENTS

| | | | |
|---|---|---|---|
| CN | 109244662 | A | 1/2019 |
| EP | 1 168 493 | A2 | 1/2002 |
| EP | 3 474 379 | A1 | 4/2019 |
| KR | 2001-0040137 | A | 5/2001 |
| KR | 10-0547394 | B1 | 1/2006 |
| KR | 10-2011-0074730 | A | 7/2011 |
| KR | 10-2014-0069968 | A | 6/2014 |
| KR | 10-2014-0093579 | A | 7/2014 |
| KR | 10-1411442 | B1 | 7/2014 |
| KR | 10-2019-0044023 | A | 4/2019 |
| KR | 10-2080305 | B1 | 2/2020 |
| WO | 2018/010817 | A1 | 1/2018 |
| WO | 2018/018473 | A1 | 2/2018 |
| WO | 2018/236821 | A1 | 12/2018 |

OTHER PUBLICATIONS

Communication dated Sep. 26, 2024, issued by the India Intellectual Property Office in Indian Patent Application No. 202317020303.

Search Report (PCT/ISA/210) issued Dec. 30, 2021 by the International Searching Authority for International Patent Application No. PCT/KR2021/012824.

Written Opinion (PCT/ISA/237) issued Dec. 30, 2021 by the International Searching Authority for International Patent Application No. PCT/KR2021/012824.

Communication dated Jan. 25, 2024, issued by the European Patent Office in counterpart European Application No. 21869792.8.

Communication issued Apr. 1, 2025 by the Korean Intellectual Property Office in Korean Patent Application No. 10-2020-0120969.

Communication issued on Aug. 7, 2025 by the European Patent Office in European Patent Application No. 21869792.8.

Communication issued on Sep. 24, 2025 by the China National Intellectual Property Administration in Chinese Patent Application No. 202180064097.0.

* cited by examiner

ANTENNA STRUCTURE AND ELECTRONIC DEVICE COMPRISING SAME

CROSS-REFERENCE TO RELATED APPLICATIONS

This application is a by-pass continuation application of International Application No. PCT/KR2021/012824, filed on Sep. 17, 2021, which is based on and claims priority to Korean Patent Application No. 10-2020-0120969, filed on Sep. 18, 2020, in the Korean Intellectual Property Office, the disclosures of which are incorporated by reference herein their entireties.

BACKGROUND

1. Field

The disclosure relates to a wireless communication system and, more specifically, to an antenna structure in the wireless communication system and an electronic device including same.

2. Description of Relate Art

To meet the demand for wireless data traffic having increased since deployment of 4G communication systems, an improved 5G or pre-5G communication system has been developed. Therefore, the 5G or pre-5G communication system is also called a 'beyond 4G network' communication system or a 'post Long Term Evolution (LTE)' system.

The 5G communication system is considered to be implemented in ultrahigh frequency (e.g., millimeter-wave (mm-Wave)) bands (e.g., 60 GHz bands) to accomplish higher data rates. To decrease propagation loss of the radio waves and increase the transmission distance in the ultrahigh frequency bands, various techniques such as beamforming, massive multiple-input multiple-output (massive MIMO), full dimensional MIMO (FD-MIMO), array antenna, analog beam forming, and large scale antenna techniques have been developed in 5G communication systems.

In addition, in 5G communication systems, advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like have been developed.

In the 5G system, advanced coding modulation (ACM) schemes such as hybrid FSK and QAM modulation (FQAM) and advanced access technologies such as sliding window superposition coding (SWSC), and filter bank multi carrier (FBMC), non-orthogonal multiple access (NOMA), and sparse code multiple access (SCMA) have also been developed.

A massive MIMO unit (MMU) in a 5G system includes multiple antenna elements. One or more antenna elements form a sub array. In this case, each of antenna elements may be formed as a stacked patch antenna and the stacked patch antenna means an antenna that provides high gain/broadband by arranging two or more metal patches above and below. As the number of antenna elements required for beamforming increases, it is required to design an antenna with a more effective structure in consideration of a volume occupied by an antenna, a process for fixing a patch, and the like.

SUMMARY

Provided are a metal patch structure and a substrate applied to an antenna in a wireless communication system.

Furthermore, provided are a method and an antenna structure capable of obtaining low production costs and reducing a volume (thin volume) occupied by an antenna by using a substrate having a support structure in a wireless communication system.

In addition, provided are a method and an antenna structure for forming a target frequency band while maintaining directivity of an antenna in a wireless communication system.

According to an aspect of the disclosure, an antenna includes: a first metal patch; a second metal patch; a feeding circuit; and a substrate. The first metal patch and the second metal patch are arranged on the substrate. The feeding circuit is coupled to the substrate and is spaced apart from the first metal patch.

According to another aspect of the disclosure, a device includes: a feeding circuit; a substrate; at least one processor; and a sub array comprising a plurality of antenna elements. At least one of the plurality of antenna elements includes: a first metal patch disposed on the substrate; and a second metal patch disposed on the substrate while being spaced apart from the first metal patch. The feeding circuit is disposed on the substrate and is spaced apart from the first metal patch.

According to another aspect of the disclosure, a massive multiple input multiple output (MIMO) unit (MMU) device includes: a feeding circuit; a substrate; and an antenna element including a first metal patch disposed on the substrate and a second metal patch disposed on the substrate while being spaced apart from the first metal patch. The feeding circuit is disposed on the substrate and is spaced apart from the first metal patch. The substrate includes a ground area, a first capacitor is formed by the first metal patch and the second metal patch, a second capacitor is formed by the first metal patch and the ground area, and a third capacitor is formed by the second metal patch and the ground area.

According to one or more embodiments of the disclosure, a device may reduce a volume, which becomes a thin volume, of a space occupied by an antenna through a substrate having a support structure and enable the manufacture of antenna equipment at an effective cost.

The device according to one or more embodiments of the disclosure may secure a target radiation frequency band while maintaining directivity compared to an existing antenna through an antenna having a specific structure even if reducing a volume of an antenna.

In addition, advantageous effects obtainable from the disclosure may not be limited to the above mentioned effects, and other effects which are not mentioned may be clearly understood, through the following descriptions, by those skilled in the art to which the disclosure pertains.

BRIEF DESCRIPTION OF THE DRAWINGS

The above and other aspects, features, and advantages of certain embodiments of the disclosure will be more apparent from the following description taken in conjunction with the accompanying drawings, in which.

In connection with a description of the drawings, like or similar reference numerals may be used for like or similar elements.

DETAILED DESCRIPTION

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

Hereinafter, one or more embodiments of the disclosure will be described based on an approach of hardware. However, one or more embodiments of the disclosure include a technology that uses both hardware and software, and thus the one or more embodiments of the disclosure may not exclude the perspective of software.

In the following description, terms referring to signals (e.g., symbol, stream, data, and beamforming signal), terms related to beams (e.g., multi-beam, multiple beams, single beam, dual beam, quad-beam, and beamforming), terms referring to network entities, terms referring to device elements (e.g., antenna array, antenna element, communication unit, and antenna), and the like are illustratively used. Therefore, the disclosure is not limited by the terms as used below, and other terms referring to subjects having equivalent technical meanings may be used.

In the disclosure, one or more embodiments will be described using terms employed in some communication standards (e.g., the 3rd generation partnership project (3GPP)), but they are only for the sake of illustration. The embodiments of the disclosure may also be easily applied to other communication systems through modifications.

Figure 1:
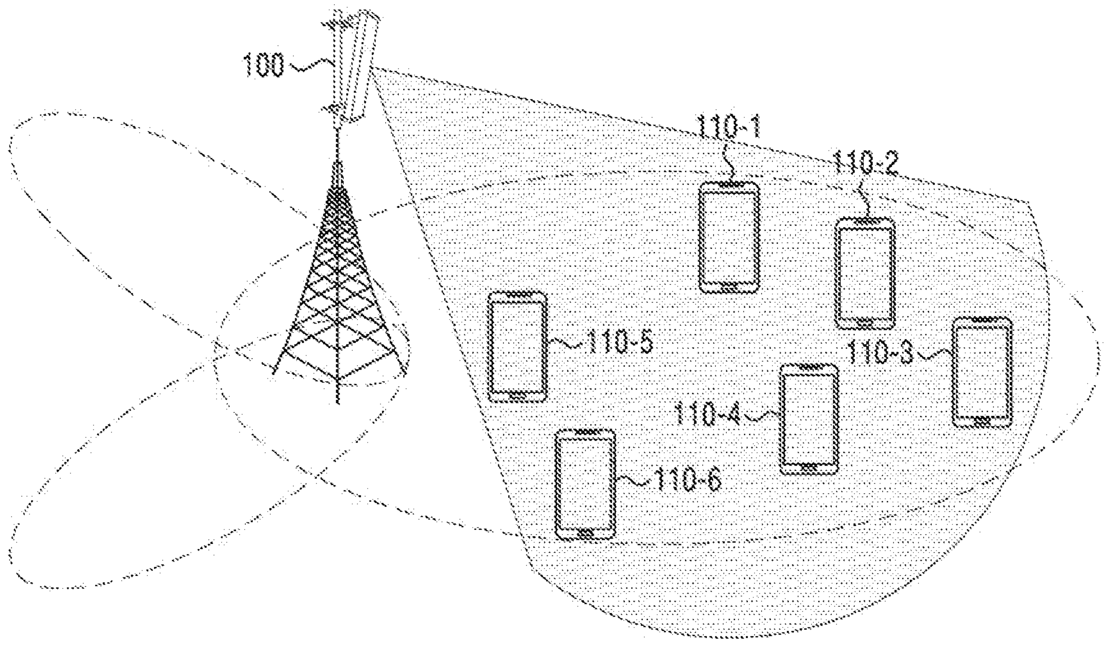
FIG. 1 illustrates a wireless communication system according to one or more embodiments of the disclosure.

FIG. 1 illustrates a wireless communication system according to one or more embodiments of the disclosure. The wireless communication environment shown FIG. 1 illustrates an example of a base station 100 and terminals 110-1 to 110-6 as parts of a node using a wireless channel.

The base station 100 corresponds to a network infrastructure for providing wireless access to the terminals 110-1 to 110-6. The base station 100 has a coverage defined as a predetermined geographic area based on a distance in which a signal is transmittable. The base station 100 may be referred to as "an access point (AP)", "an eNodeB (eNB)", "a 5th generation node", "a 5G NodeB (NB)", "a wireless point", "a transmission/reception point (TRP)", "an access unit", "a distributed unit (DU)", "a transmission/reception point (TRP)", "a radio unit (RU)", a remote radio head (RRH), or other names having a technical meaning equivalent thereto, in addition to a base station. The base station 100 may transmit a downlink signal or receive an uplink signal.

Each of the terminal 110-1 to 110-6 is a device used by a user and performs communication with the base station 100 through a wireless channel. In some cases, the terminals 110-1 to 110-6 may be operated without involvement of a user. That is, each of the terminals 110-1 to 110-6 may be a device for performing machine type communication (MTC) and may not be carried by a user. Each of the terminals 110-1 to 110-6 may be referred to as "a user equipment (UE)", "a mobile station", "a subscriber station", "a customer-premises equipment (CPE)", "a remote terminal", "a wireless terminal", "an electronic device", "a vehicle terminal", "a user device", or another term having a technical meaning equivalent thereto, in addition to a terminal.

Figure 2:
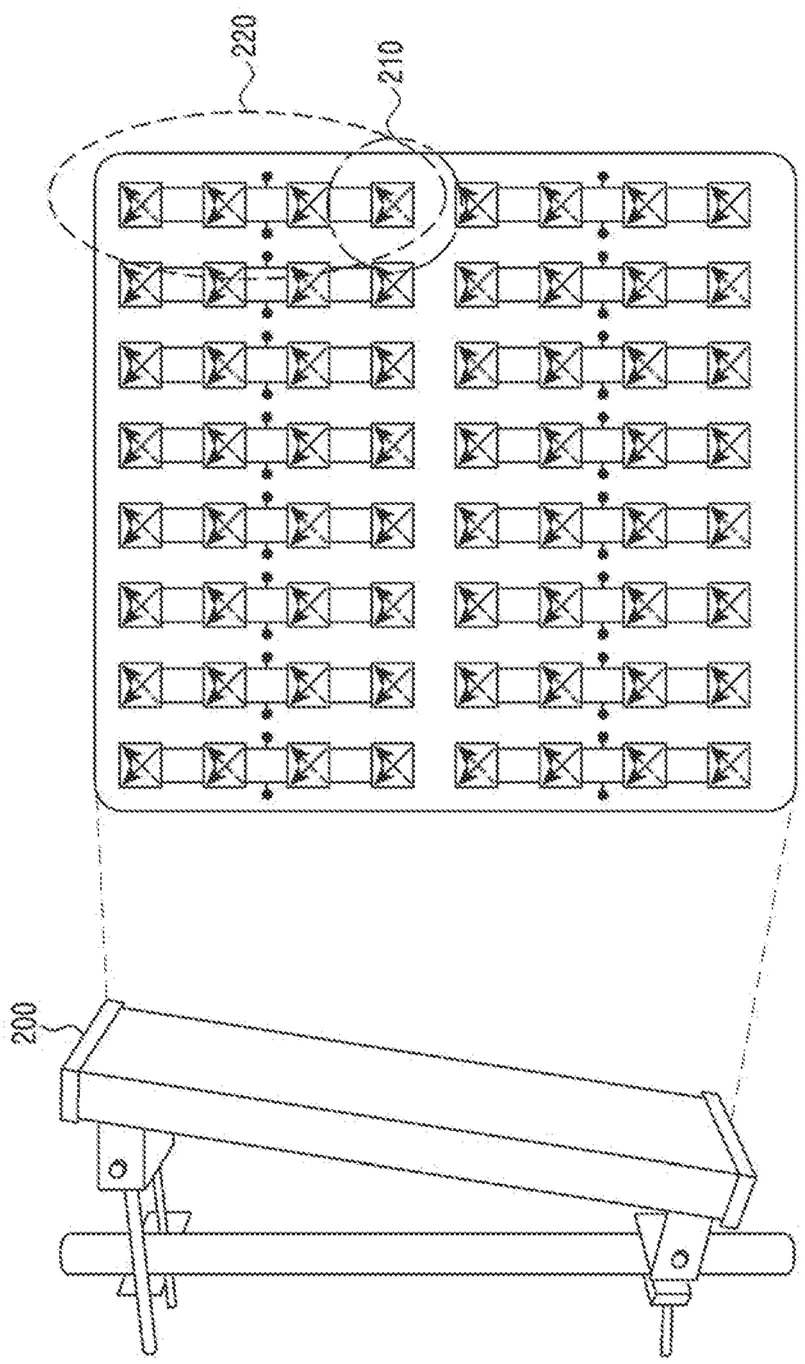
FIG. 2 illustrates a configuration of a massive multiple input multiple output (MIMO) unit (MMU) in a wireless communication system according to one or more embodiments of the disclosure.

FIG. 2 illustrates a configuration of a massive multiple input multiple output (MIMO) unit (MMU) in a wireless communication system according to one or more embodiments of the disclosure. Terms such as "... unit", "... part" or the like used below refers to a unit that processes at least one function or operation, and may be implemented by hardware, software, or a combination of hardware and software.

Referring to FIG. 2, the base station 200 may include multiple antenna elements 210. In order to raise a beamforming gain, a large number of antenna elements 210 may be used compared to input ports. A MMU device (including sub arrays 220 respectively corresponding to input ports) is described as an example of a beamforming device of the disclosure for explaining one or more embodiments of the disclosure. Each sub array 220 of the MMU device includes the same number of antenna elements 210. Embodiments of the disclosure are not limited thereto. According to an embodiment, the number of antenna elements 210 of some sub arrays 220 may be different from the number of antenna elements 210 of other sub arrays 220.

Referring to FIG. 2, each of the sub arrays 220 may include multiple antenna elements 210. Hereinafter, antenna elements arranged in 4×1 form will be described as one sub array 220 in FIG. 2, but this is for explanation of embodiments of the disclosure, and the embodiments of the disclosure are not limited to the description. One or more embodiments described below may be applied to a sub array 220 in 2×2 or 3×2 form as well.

A number of antenna elements 210 for performing wireless communication have been increased to improve communication performance. Furthermore, a number of RF parts and components for processing an RF signal received or transmitted through each of antenna elements 210 has been increased, and thus, a spatial gain and cost efficiency are essentially required in configuring a communication device in addition to satisfying communication performance. To satisfy the requirements described above, a dual-polarized antenna is used. As channel independence between signals of different polarizations is satisfied, polarization diversity and a signal gain according thereto may increase.

The number of antenna elements 210 mounted to the MMU device may increase to raise a beamforming gain of the MMU device. Accordingly, mounting of a large number of antenna elements 210 may cause increase in volume of the MMU device, a tolerance may be caused in a processing process of production of a large number of antenna elements 210, and a difficulty in management of the MMU device on which a large number of antenna elements 210 are mounted may be caused. Therefore, to solve the above-described problems, an easy and stable structure is required in mass production. The disclosure proposes a structuring using a substrate formed of a dielectric for reducing a tolerance in a processing process and reducing production costs and a metal patch for securing antenna radiation performance.

Figure 3A:
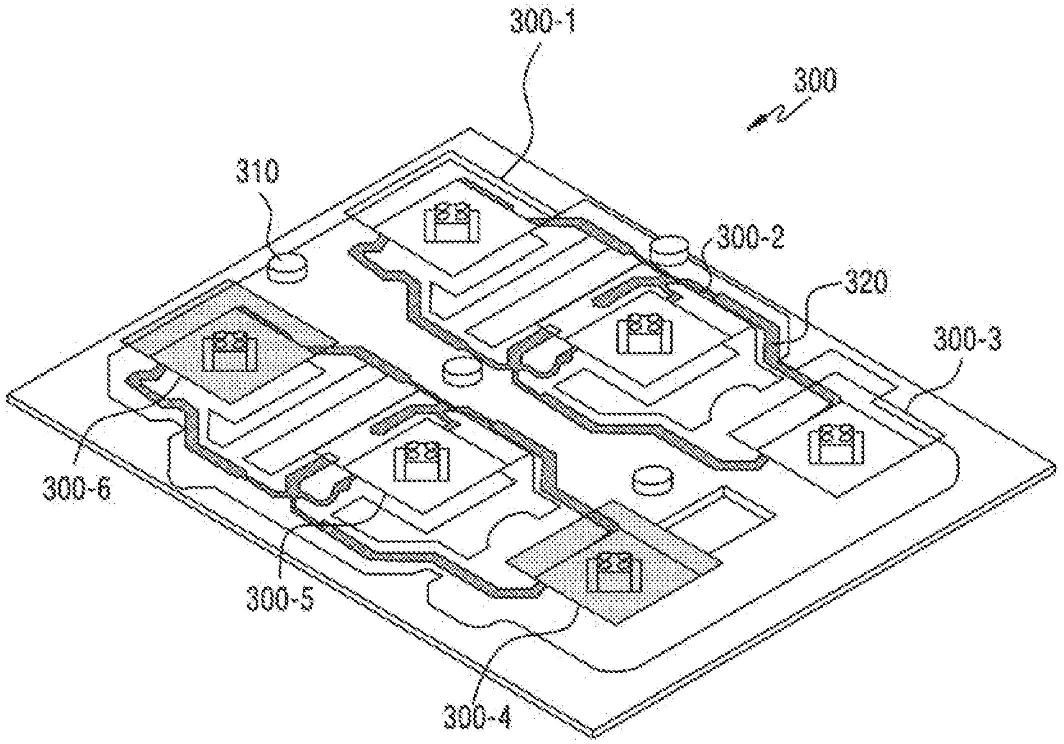
FIG. 3A and FIG. 3B illustrate a configuration of a sub array in a wireless communication system according to an embodiment of the disclosure.
Figure 3B:
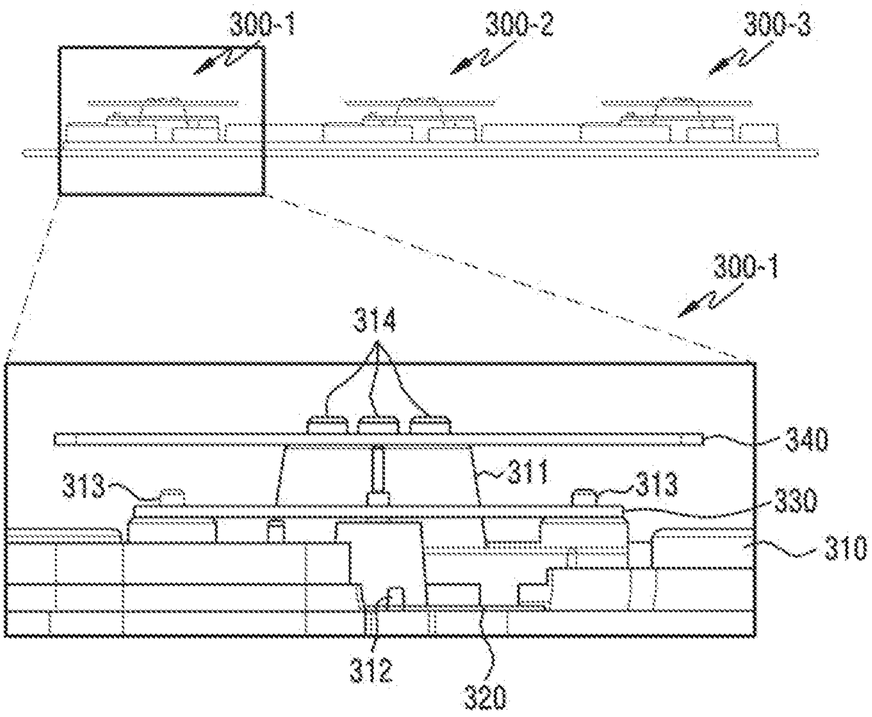
Figure 4A:
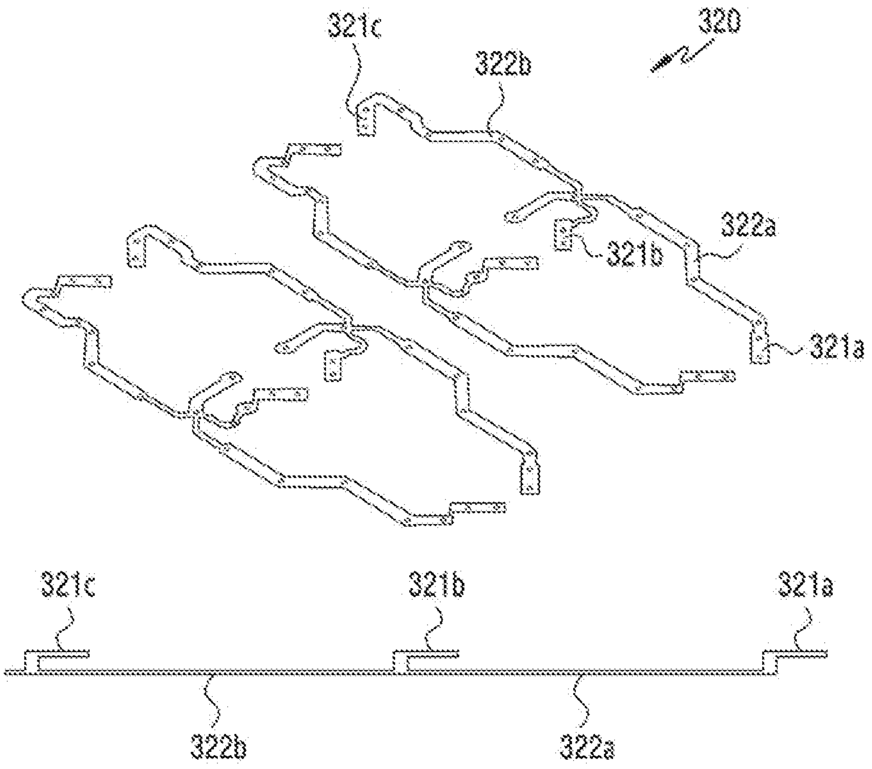
FIG. 4A illustrates a configuration of a feeding circuit according to an embodiment of the disclosure.
Figure 4B:
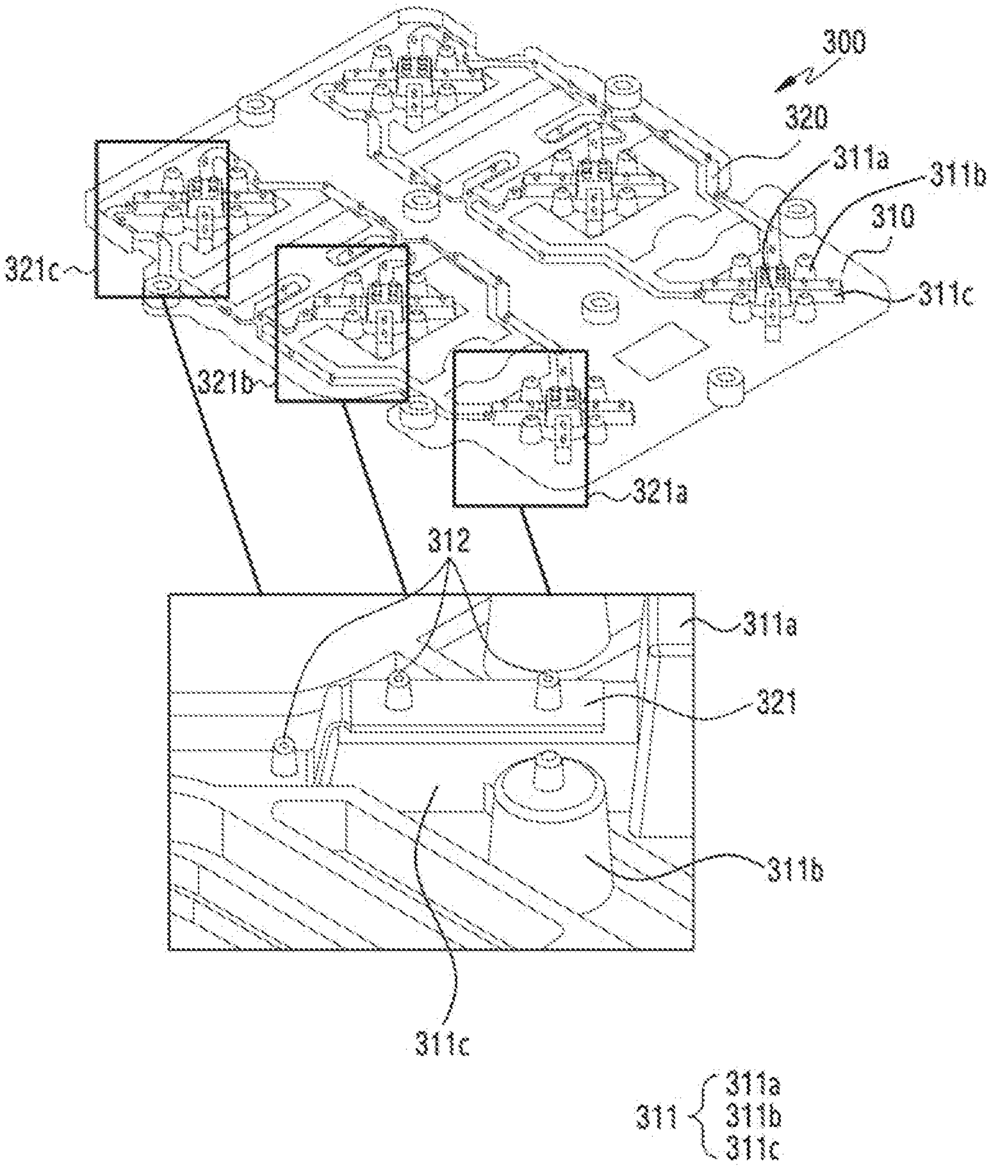
FIG. 4B illustrates a coupling structure of a feeding circuit and a substrate according to an embodiment of the disclosure.

Hereinafter, FIG. 3A and FIG. 3B illustrate an overall structure of antenna elements 210 and a sub array 220 included in an MMU device. FIG. 4A and FIG. 4B illustrate a feeding circuit, metal patch at an upper end and lower end, and a substrate included in each of the antenna elements 210. Hereinafter, a structure of the antenna elements 210 and the sub array 220 included in the MMU device according to an embodiment of the disclosure are described.

FIG. 3A and FIG. 3B illustrate a configuration of a sub array in a wireless communication system according to an embodiment of the disclosure. FIG. 3A and FIG. 3B illustrate a substrate on which six antenna elements are arranged as an example for explaining the configuration of the electronic device, but the disclosure is not limited thereto. Embodiments to be described below may be applied to a case of three antenna elements or four antenna elements depending on production methods, as well.

Referring to FIG. 3A, the sub array 300 may include six antenna elements 300-1, 300-2, . . . , to 300-6, a substrate 310, and a feeding circuit 320.

Each of the antenna elements 300-1, 300-2, . . . , to 300-6 may correspond to a stacked patch antenna. The stacked patch antenna is an antenna having two or more metal patches arranged at predetermined intervals to obtain a high gain and to be used in a wide frequency band. According to an embodiment, the stacked patch antenna may include multiple metal patches. For example, the stacked patch antenna may include three or more metal patches.

The substrate 310 may include a dielectric having a permittivity. According to an embodiment, the dielectric may be formed of a material having a permittivity or two (2) [F/m] to six (6) [F/m]. The substrate 310 including a dielectric having a permittivity may have higher moldability unlike an existing printed circuit board (PCB), and thus, may be formed in various forms. Accordingly, the substrate 310 may be configured to have a support structure.

According to an embodiment, the substrate 310 may include a protrusion to be coupled to the antenna elements 300-1, 300-2, . . . , to 300-6 and the feeding circuit 320. That is, the substrate 310 may have a structure having a protrusion. For example, as described below, the substrate 310 may be coupled through the protrusion of the support structure and coupling holes of a first metal patch and a second metal patch of the stacked patch antenna.

In addition, the substrate 310 may be coupled to the feeding circuit 320 through connection between a protrusion of the support substrate and a coupling hole of the feeding circuit 320. However, the substrate 310 may be coupled through another structure to be coupled to the antenna elements 300-1, 300-2, . . . , to 300-6 and the feeding circuit, and thus, the disclosure is not limited to coupling by the protrusion of the substrate 310. For example, a rail structure may extend from the support structure of the substrate 310 to be coupled to the antenna elements 300-1, 300-2, . . . , to 300-6 and the feeding circuit 320, etc. However, a structure in which the substrate 310 includes the protrusion and coupling is performed through the protrusion will be described.

The feeding circuit 320 may be fed by at least one wireless communication circuit inside the MMU device to feed the antenna elements 300-1, 300-2, . . . , to 300-6. The feeding circuit 320 may include a coupling hole to be coupled to the substrate 310. For example, the coupling hole of the feeding circuit 320 may be formed through a line for forming the feeding circuit and disposed on the center based on the width of the line.

According to an embodiment, the feeding circuit 320 may be coupled to the substrate 310 and disposed on the lower end thereof to be spaced apart from metal patches of the antenna elements 300-1, 300-2, . . . , to 300-6. For example, the feeding circuit 320 may be disposed spaced apart from a metal patch at the lower end part among metal patches included in each of the antenna elements 300-1, 300-2, . . . , to 300-6.

FIG. 3B is a sectional view of the sub array 300 viewed from one side and an enlarged view of an antenna element 300-1. Each of the antenna elements 300-1, 300-2, . . . , to 300-6 may be a stacked patch antenna including two metal patches. However, the disclosure is not limited thereto. For example, each of the antenna elements may be a patch antenna including three or more metal patches. Furthermore, referring to FIG. 3B, a metal patch at an upper end part has an area larger than that of a metal patch at a lower end part, but this is for convenience of explanation, and the disclosure is not limited thereto. For example, the metal patch at the upper end part and the metal patch at the lower end part may be formed to have the same area.

Referring to FIG. 3B, the antenna element 300-1 may include the substrate 310, the feeding circuit 320, a first metal patch 330, and a second metal patch 340. The substrate 310 may include a dielectric having a permittivity. According to an embodiment, the substrate 310 may include protrusions 312, 313, 314 and a support 311 to be coupled to the feeding circuit 320, the first metal patch 330, and the second metal patch 340. For example, a protrusion 312 may be coupled to the feeding circuit 320. For another example, protrusions 313 may be coupled to the second metal patch 340. For still another example, protrusions 314 may be coupled to the first metal patch 330. According to an embodiment, the protrusions 312, 313, 314 may be arranged on the upper end part of the support 311.

According to an embodiment, as shown in FIG. 3B, the feeding points 321 may be disposed spaced apart under the first metal patch 330 and may be coupled to the protrusion 312 of the substrate 310. Here, depending on the feeding points 321 of the feeding circuit 320, in case that the first metal patch 330 is fed, an indirect feeding may be formed on the first metal patch 330 due to coupling. In addition, when feeding the first metal patch 330 through the feeding points 321 by the coupling feeding, feeding may be performed through different paths in different phases to form dual polarization.

Hereinafter, the substrate 310, the feeding circuit 320, the first metal patch 330, and the second metal patch 340 constituting the antenna elements 300-1, 300-2, . . . , to 300-6 and the sub array 300 will be described with reference to FIG. 4 to FIG. 6.

FIG. 4A illustrates a configuration of a feeding circuit according to an embodiment of the disclosure. FIG. 4B illustrates a coupling structure of a feeding circuit and a substrate according to an embodiment of the disclosure. FIG. 4A and FIG. 4B illustrate a feeding circuit having three feeding points and formed in three stages. However, the description does not limit embodiments of the disclosure. For example, the sub array and the MMU device may be formed of multiple feeding circuits having two feeding points and formed in two stages. For another example, the sub array and the MMU device may be formed of multiple feeding circuits having four feeding points and formed in four stages. The feeding circuit is not limited to the shape shown in FIG. 4A and FIG. 4B and may be formed in other shapes different from the described shape.

Referring to FIG. 4A, the feeding circuit 320 may include multiple feeding points 321*a*, 321*b*, 321*c* and connection units 322*a* and 322*b* for connecting the multiple feeding points 321*a*, 321*b*, 321*c*. According to an embodiment, the feeding circuit 320 may be fed by at least one wireless communication circuit. For example, feeding points which is fed by at least one wireless communication circuit may include at least one point of the connection units 322*a* and 322*b*, at least one point of the feeding points 321*a*, 321*b*, 321*c*, or at least one point of one end existing opposite to another end to which the multiple feeding points 321*a*, 321*b*, 321*c* are connected.

According to an embodiment, the feeding points 321*a*, 321*b*, 321*c* may include a portion perpendicular to the connection units 322*a* and 322*b* and a portion parallel with the connection units 322*a* and 322*b*. According to an embodiment, the feeding points 321*a*, 321*b*, 321*c* and the connection units 322*a* and 322*b* of the feeding circuit 320 may include coupling holes to be coupled to a protrusion 312 of the substrate 310.

According to an embodiment, the coupling holes may be arranged at the center based on the width of a line constituting the feeding circuit 320. According to an embodiment, in case that the first metal patch 330 is fed through the feeding points 321 of the feeding circuit 320, the first metal patch 330 may be fed through multiple paths to form dual polarization. For example, when feeding through two paths including a first path and a second path through which feeding is performed by the feeding points 321, in case that a current phase of the first path is formed at +45°, a current phase of the second path may be formed at −45°. For another example, in case that a current phase of the first path is formed at −45°, a current phase of the second path may be formed at +45°.

FIG. 4B illustrates the feeding circuit 320 coupled to the substrate 310 in the sub array 300 and, more specifically, a feature in which the feeding points 321 of the feeding circuit 320 is coupled to the protrusion 312 of the substrate 310.

Referring to FIG. 4B, the substrate 310 including a supportable structure may include multiple supports 311 and the supports 311 may include a first support 311*a*, a second support 311*b*, and a third support 311*c*. According to an embodiment, the first support 311*a* may be disposed at the center of the support 311. The protrusions 314 may be disposed at an upper part of the first support 311*a*. Furthermore, the first support 311*a* may be disposed coincident with the center of the second metal patch 340 in FIG. 3B.

According to an embodiment, the second support 311*b* may be disposed spaced apart from the first support 311*a* and multiple second supports may be formed. For example, in FIG. 4B, four second supports 311*b* may be arranged with respect to one antenna element. However, the disclosure is not limited thereto. For example, less than four second supports 311*b* may be arranged with respect to one antenna element. For another example, more than four second supports 311*b* may be arranged with respect to one antenna element. Furthermore, the protrusions 313 may be arranged on an upper part of the second support 311*b*.

According to an embodiment, the third support 311*c* may be disposed extending from the first support 311*a* and multiple third supports may be formed. For example, in FIG. 4B, third supports 311*c* may be arranged extending from the first support 311*a* with respect to one antenna element. However, the third supports 311*c* may be arranged spaced apart from the first support 311*a* to form a separate structure from the first support 311*a* and a structure according to an embodiment of the disclosure is not limited to the above-described structure. Furthermore, the protrusion 312 may be disposed at an upper part of the third support 311*c*.

Figure 5A:
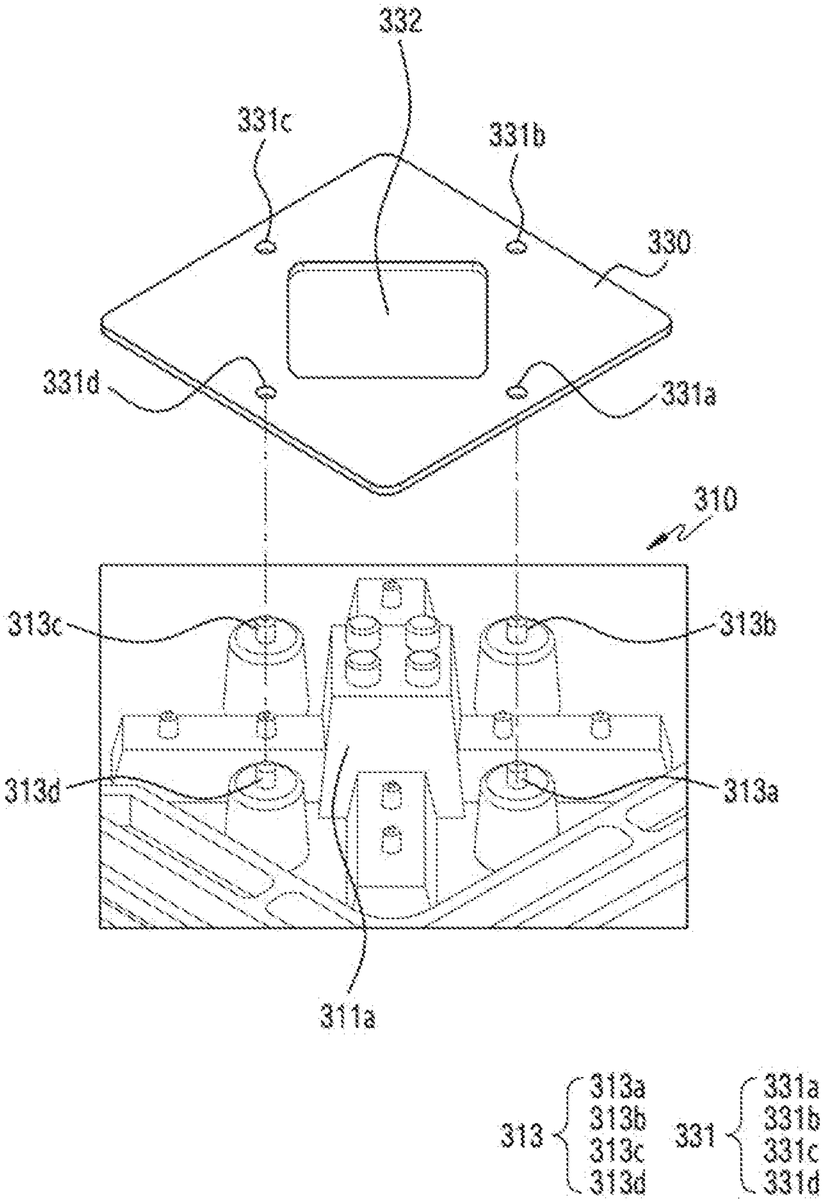
FIG. 5A illustrates a configuration of a first metal patch according to an embodiment of the disclosure.
Figure 5B:
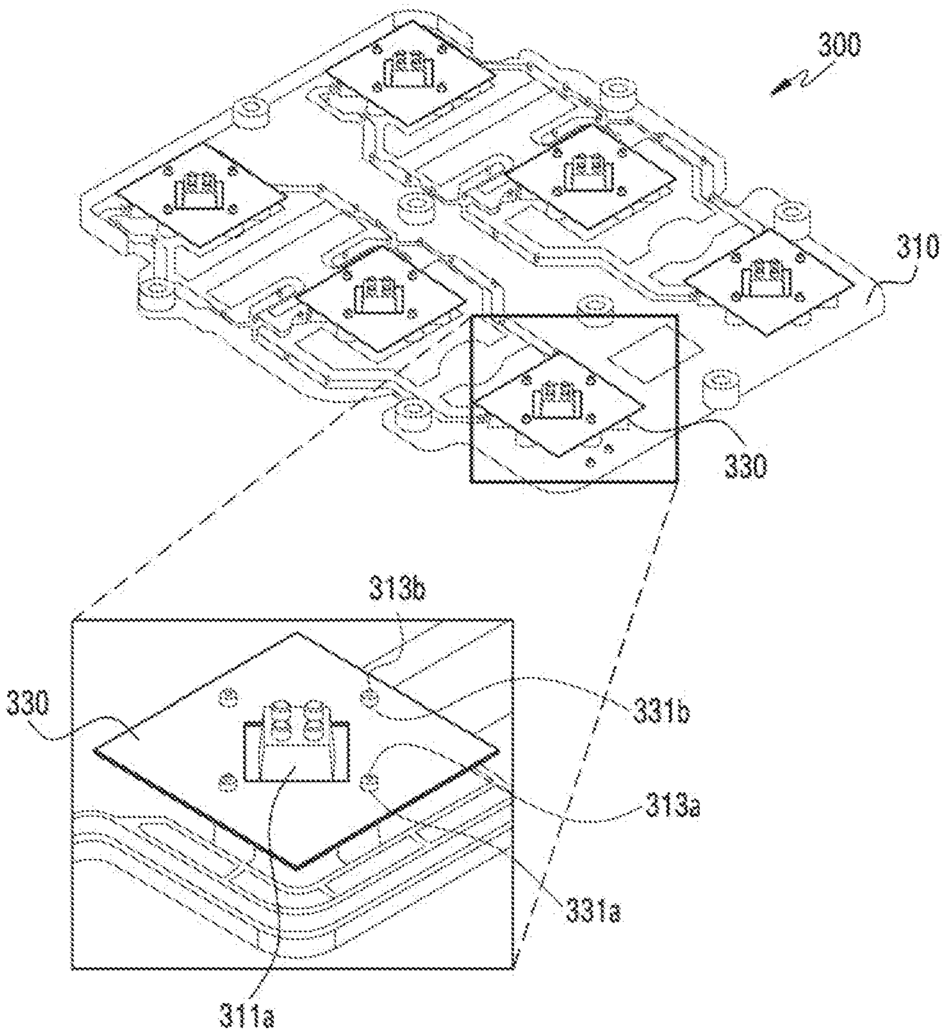
FIG. 5B illustrates a coupling structure of a first metal patch and a substrate according to an embodiment of the disclosure.

FIG. 5A illustrates a configuration of a first metal patch according to an embodiment of the disclosure. FIG. 5B illustrates a coupling structure of a first metal patch and a substrate according to an embodiment of the disclosure. The first metal patch is not limited to the shape shown in FIG. 5A and FIG. 5B and may be formed in other shapes different from the described shape. For example, the first metal patch may be formed in a structure having different horizontal and vertical lengths. For another example, the number of coupling holes formed therein may be three, five, six, or the like.

Referring to FIG. 5A, the first metal patch 330 may include coupling holes 331 and an opening 332. According to an embodiment, multiple coupling holes 331 may be formed. For example, the coupling holes 331 may include four coupling holes 331*a* to 331*d* in FIG. 5A but the disclosure is not limited thereto. For example, the number of coupling holes 331 may be three, five, six, or higher and correspondingly, the protrusions 313 may be formed in the same number as the coupling holes 331. According to an embodiment, the coupling holes 331*a* to 331*d* of the first metal patch 330 may correspond to be coupled to the protrusions 313*a* to 313*d* of the substrate 310. According to an embodiment, the coupling holes 331 may be disposed spaced apart from vertexes of the first metal patch 330 to minimize radiation performance reduction of the first metal patch 330. For example, referring to FIG. 5A, the coupling holes 331 may be arranged between each vertex of the opening 332 and each edge of the first metal patch 330.

The opening 332 may be formed through the center of the first metal patch 330. According to an embodiment, since antenna radiation performance varies depending on existence and an area of the opening 332, the area of the opening 332 may be different, depending on circumstances. For example, as described below, the area of the opening 332 may be designed based on a capacitor value that varies with the area of the opening 332. According to an embodiment, the first support 311*a* of the substrate 310 may extend through the opening 332 of the first metal patch 330. Accordingly, the first metal patch 330 and the second metal patch 340 may be arranged spaced apart from each other.

According to an embodiment, among the multiple metal patches of the stacked patch antenna, a metal patch disposed at the lower end part may include an opening. In this case, the opening may be disposed at a designated position of the metal patch. The designated position may be determined based on an electric field generated by feeding a radiator (e.g., a metal patch) from a feeding circuit.

The radiator may radiate a signal to the air through the electric field generated by feeding. Antenna radiation performance may be related to a strength of the electric field. In order to form an opening while minimizing an effect on antenna radiation performance, a change in electric field due to the opening needs to be minimized. In case that an opening is formed in where the electric field strength is low, radiation performance may be less affected.

The designated area may be configured to have a capacitance that may allow a required radiation band to be formed while having a small effect on radiation performance. In one embodiment, the patch is a rectangular metal patch. In case of feeding by a feeding circuit to a first vertex, the highest electric field is formed at the first vertex and at the second vertex positioned diagonally to the first vertex, and thus, radiation performance may be high. Accordingly, an area in which an electric field is null may be formed at the center of the metal patch, which corresponds to the middle point between the first vertex and the second vertex.

For another example, in case of feeding vertexes (e.g., a first vertex and a third vertex) adjacent to the metal patch for dual polarization as described above, by feeding with a first phase fed to the first vertex, the highest electric field may be formed at the first vertex and at the second vertex positioned diagonally to the first vertex. Furthermore, by feeding with a second phase fed to the third vertex, the highest electric field is formed at the third vertex and at a fourth vertex positioned diagonally to the third vertex. Accordingly, an area in which an electric field is null may be formed at the center of the metal patch, which corresponds to the middle point between the first vertex and the second vertex, and an area in which an electric field is null may be formed at the center of the metal patch, which corresponds to the middle point between the third vertex and the fourth vertex. Accordingly, by forming an opening at the center of the rectangular metal patch disposed at the lower end part, that is, the area in which the electric field is null, it may be possible not to affect radiation performance of the metal patch and to form a target radiation band.

Since a capacitor may be formed between metal patches or between a metal patch and a ground area, and an area of a conductor may affect a capacitance of the capacitor, formation of an opening may cause reduction in capacitance. In other words, it may be identified through equations (described below) that capacitance adjustment may cause a change in resonance frequency, and thus, a required radiation band may be obtainable.

Accordingly, hereinafter, an opening may indicate a designated area that may correspond to an area (e.g., a null area) in which an electric field has a low strength. For example, in case of a rectangular patch, the center of the metal patch may correspond to the designated area. However, embodiments of the disclosure are not limited to the term "center". An opening may be disposed in any area other than the center of a patch even if the area is in a lateral surface within the patch, as long as the area has an electric field having a strength less than or equal to a threshold value or corresponding to null.

FIG. 5B illustrates the first metal patch 330 to be coupled to the substrate 310 and, specifically, a feature in which the coupling holes 331 of the first metal patch 330 correspond and are coupled to the protrusions 313 of the substrate 310, respectively.

According to an embodiment, the protrusions 313*b* of the second support 311*b* and the coupling holes 331 of the first metal patch 330 may correspond to be coupled to each other, respectively. Here, in order to couple the second support 311*b* and the first metal patch 330, the first support 311*a* may extend through the opening 332 existing at the center of the first metal patch 330.

According to an embodiment, the first metal patch 330 may receive coupling feeding from the feeding circuit 320 disposed at the lower end of the first metal patch 330. Accordingly, a signal corresponding to a specific frequency band may be radiated from the first metal patch 330.

As described above, compared to an existing structure using a printed circuit board (PCB), the structure using the supports 311 and protrusions 313 formed on the substrate 310 and the coupling holes 331 formed through the first metal patch 330 may allow an antenna to be formed without an additional process and may reduce a volume occupied by an antenna element by reducing an interval between metal patches.

Furthermore, as described below, through the opening 332 formed through the first metal patch 330, it may be possible to solve difficulties in changing a resonance frequency and forming a band that may occur when an interval between metal patches is shortened.

Figure 6A:
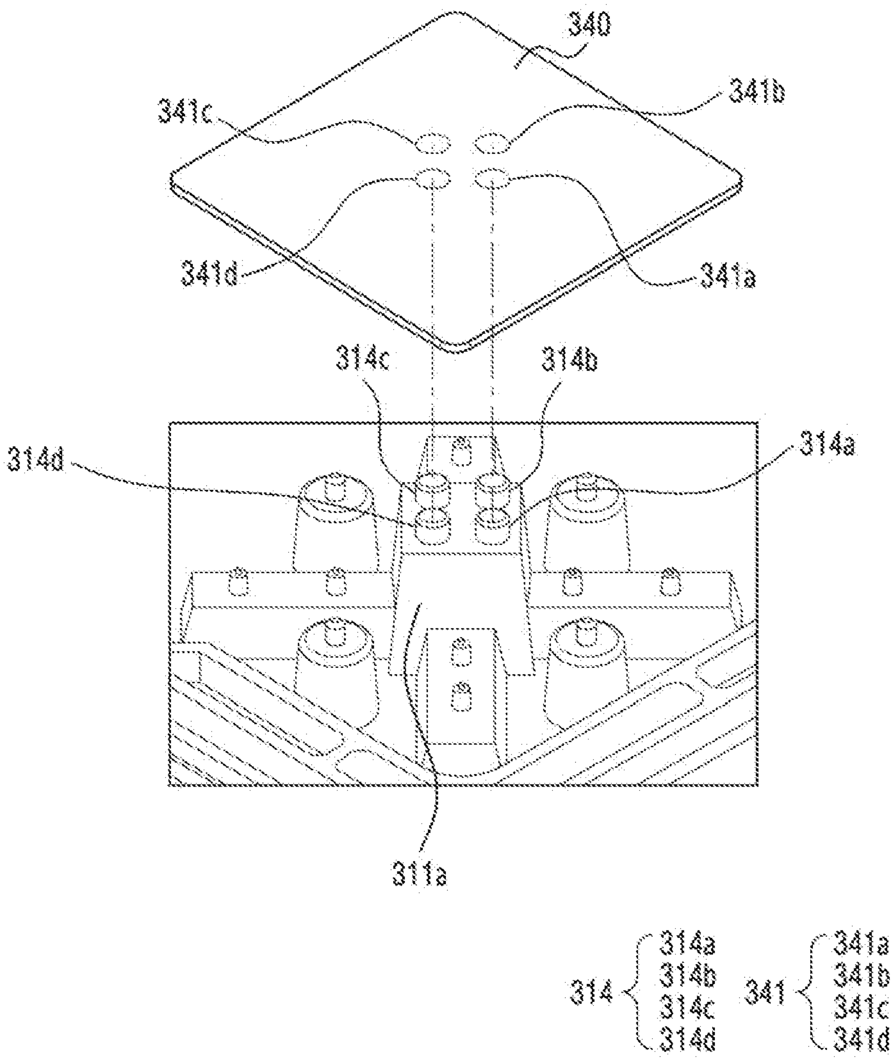
FIG. 6A illustrates a configuration of a second metal patch according to an embodiment of the disclosure.
Figure 6B:
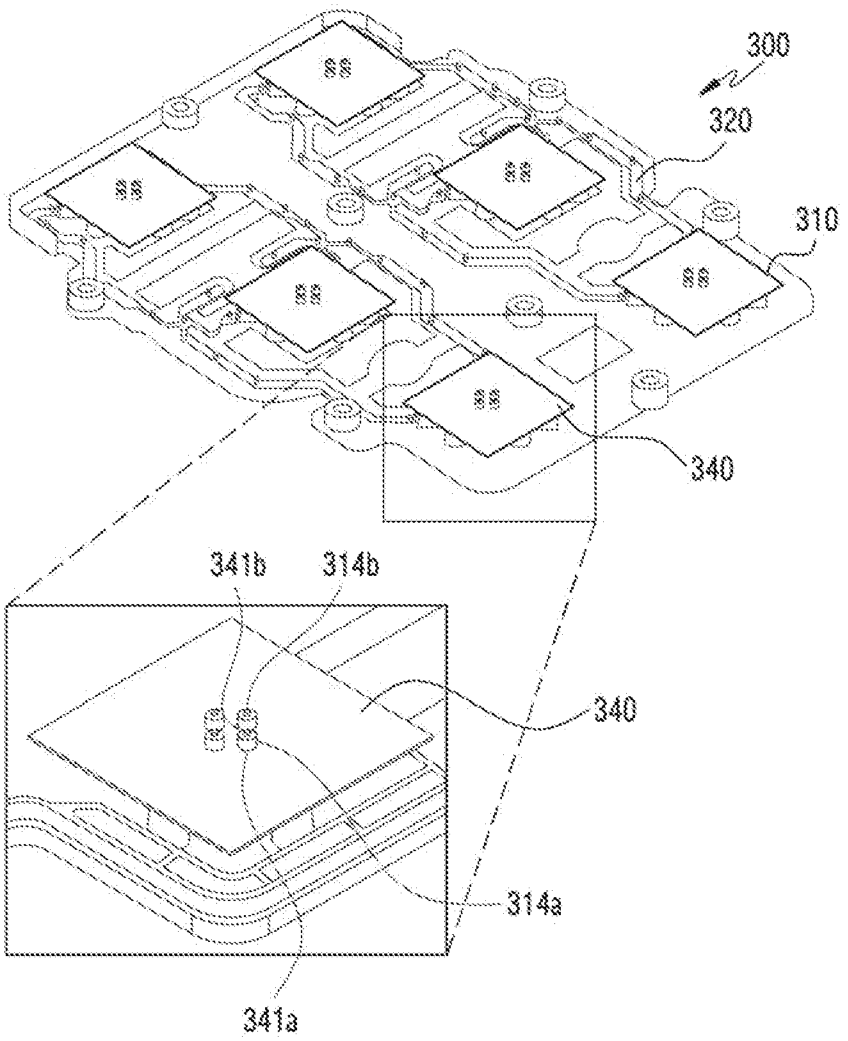
FIG. 6B illustrates a coupling structure of a second metal patch and a substrate according to an embodiment of the disclosure.

FIG. 6A illustrates a configuration of a second metal patch according to an embodiment of the disclosure. FIG. 6B illustrates a coupling structure of a second metal patch and a substrate according to an embodiment of the disclosure. The second metal patch is not limited to the shape shown in FIG. 5A and FIG. 5B and may be formed in other shapes different from the described shape.

Referring to FIG. 6A, the second metal patch 340 may include coupling holes 341. According to an embodiment, multiple coupling holes 341 may be formed. For example, the coupling hole 341 may include four coupling holes 341*a*, 341*b*, 341*c*, 341*d* in FIG. 6A but the disclosure is not limited thereto. For example, the number of the coupling holes 341 may be three, five, six, or more and accordingly, the protrusions 314 may be formed to have the same number as the coupling holes 341.

According to an embodiment, the coupling holes 341*a*, 341*b*, 341*c*, 341*d* of the second metal patch 340 may correspond to be coupled to the protrusions 314*a*, 314*b*, 314*c*, 314*d* of the substrate 310, respectively. Furthermore, the coupling holes 341 may be disposed at the center of the second metal patch 340 to minimize radiation performance reduction of the second metal patch 340. That is, radiation performance may be formed to be high at an edge or vertexes of the second metal patch 340 and considering this, the coupling holes 341 may be disposed at the center of the second metal patch 340.

FIG. 6B illustrates the second metal patch 340 to be coupled to the substrate 310 and, specifically, a feature in which the coupling holes 341 of the second metal patch 340 correspond and are coupled to the protrusions 314 of the substrate 310, respectively.

According to an embodiment, the protrusions 314 of the first support 311*a* and the coupling holes 341 of the second metal patch 340 may correspond to be coupled to each other, respectively. In this case, the second metal patch may be coupled to the protrusions 314 arranged on the upper part of the first support 311*a*, and thus, may be disposed spaced apart from the first metal patch 330 to be coupled to the second support 311*b*.

According to an embodiment, the first metal patch 330 may receive coupling feeding from the feeding circuit 320 disposed at the lower end of the first metal patch 330 and the second metal patch 340 may receive coupling feeding from the first metal patch 330 and the feeding circuit 320. Accordingly, a signal corresponding to a specific frequency band may be radiated from the second metal patch 340.

FIG. 3 to FIG. 6 illustrate the sub array structure in which each antenna element includes the stacked patch antenna according to an embodiment of the disclosure. The substrate formed of a dielectric having a permittivity has good moldability, and thus, may be formed to have a support structure and a protrusion and the first metal patch and the second metal patch may be coupled to the protrusion of the substrate in an assembling or fusion manner. Therefore, an interval between the first metal patch and the second metal patch may be shorten and a volume occupied by each antenna element including the staked patch antenna may be reduced. Accordingly, the number of antenna elements to be mounted to the massive multiple-input multiple-output (MIMO) unit (MMU) device may increase.

However, due to a shortened interval between metal patches in the staked patch antenna constituting the antenna element is shorten, it may be difficult to form a required resonance frequency band. To solve the problem, by structuring the staked patch antenna using the first metal patch including the opening, embodiments of the disclosure may form a target resonance frequency band of a signal radiated from the antenna and maintain the same directivity as before.

In FIG. 7A to FIG. 9C, as described above, difficulties in changing a frequency band and forming a band, which may occur when an interval between a first metal patch and a second metal patch is shortened in an existing staked patch antenna is described and radiation performance of an antenna which is improved by a first metal patch including an opening according to an embodiment of the disclosure.

Figure 7A:
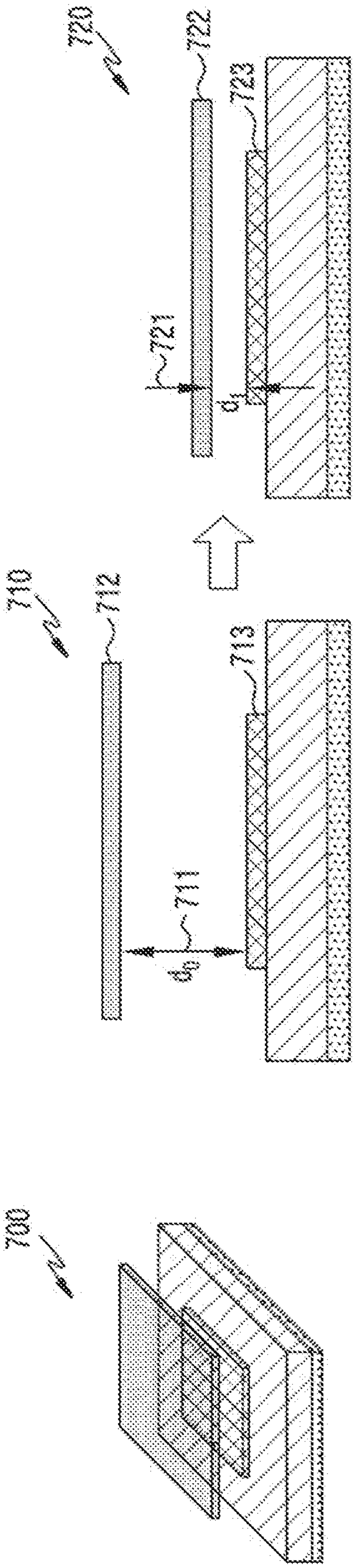
FIG. 7A illustrates a configuration of an antenna according to decrease in interval between patches of an existing antenna.
Figure 7B:
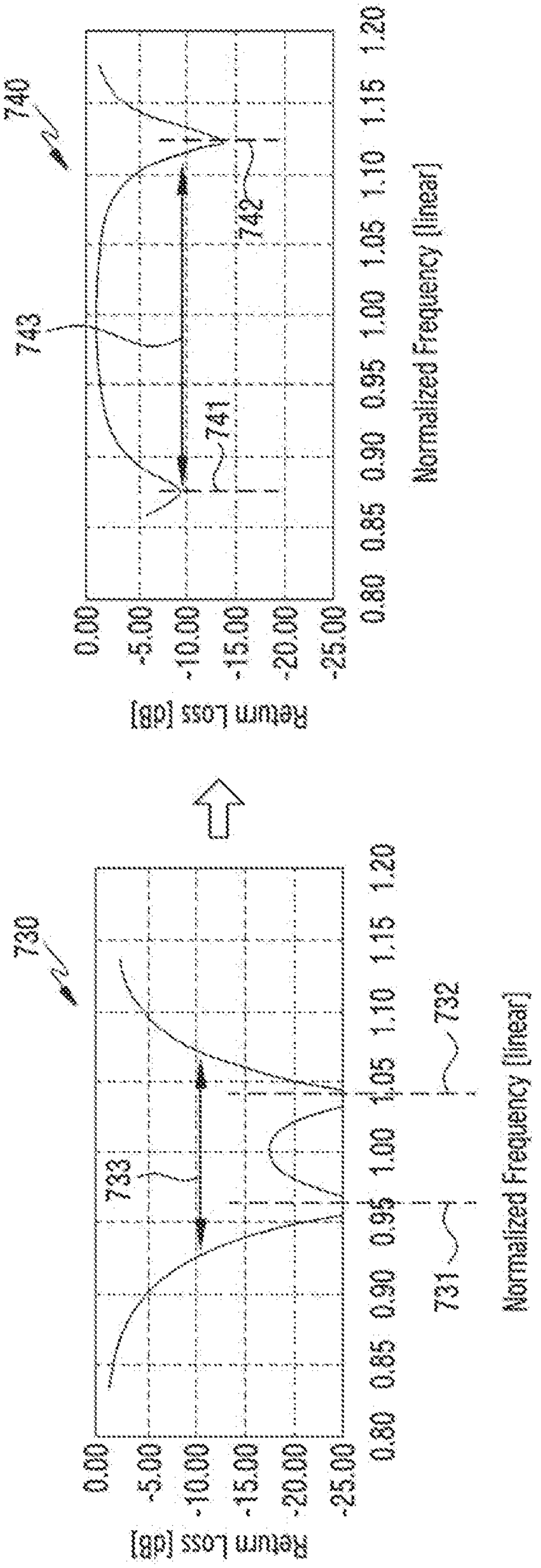
FIG. 7B illustrates antenna performance according to decrease in interval between patches of an existing antenna.

FIG. 7A illustrates a configuration of an antenna according to decrease in an interval between patches of an existing antenna. FIG. 7B illustrates antenna performance according to decrease in an interval between patches of an existing antenna. An electronic device 700 of FIG. 7A is described based on a stacked patch antenna including a substrate including a metal patch at the upper end part, a metal patch at the lower end part, and a ground area.

Referring to FIG. 7A, a volume occupied by an antenna element may be reduced by reducing an interval between a metal patch at the upper end and a metal patch at the lower end so as to mount multiple antenna elements (e.g., stacked patch antennas) on the MMU device. According to an embodiment, a regular stacked patch antenna 710 may have an interval 711 between a metal patch 712 at the upper end and a metal patch 713 at the lower end, and the interval 711 may be formed to have a length of $d_0$. For example, when a wavelength of a signal to be radiated from the antenna is λ, $d_0$ may be formed to have a length of λ/12-λ10.

On the contrary, a stacked patch antenna 720 having a reduced interval may have an interval 721 between a metal patch 722 at the upper end and a metal patch 723 at the lower end, and the interval may be formed to have a length of $d_1$. Here, $d_1$ may be formed to have a value smaller than that of $d_0$. For example, when a wavelength of a signal to be radiated from the antenna is λ, $d_1$ may be formed to have a length of λ/24-λ/20.

FIG. 7B illustrates a first graph 730 indicating a return loss of the regular stacked patch antenna 710 of FIG. 7A and a second graph 740 indicating a return loss of the stacked patch antenna 720 having the reduced interval. In each graph, the x-axis represents a normalized frequency and the y-axis represents a return loss. The first graph 730 indicates a radiation band with respect to the regular stacked patch antenna 710, a first resonance frequency 731 may be formed to be about 0.95, and the second resonance frequency 732 may be formed to be about 1.05. Accordingly, since the interval between the first resonance frequency 731 and the second resonance frequency 732 is narrow and the return loss in each resonance frequency band has a value less than −25 dB, a resonance band 733 formed based on a return loss value of −10 dB may be clearly formed.

On the contrary, referring to the second graph 740, in the stacked patch antenna 720 having the reduced interval, a first resonance frequency 741 may be formed to be about 0.87, and the second resonance frequency 742 may be formed to be about 1.13. Accordingly, since the interval between the first resonance frequency 741 and the second resonance frequency 742 is widen and the return loss in each resonance frequency band has a value of about −10 dB, a resonance band 743 may not be formed.

As described above, in case that the interval between patches is reduced in the regular stacked patch antenna, it may difficult to form a radiation band by double resonance. On the contrary, the stacked patch antenna including the metal patch at the lower end part, which includes an opening according to an embodiment of the disclosure may maintain antenna radiation performance although the interval between patches is reduced. In relation to this, a description will be made with reference to FIG. 8.

Figure 8A:
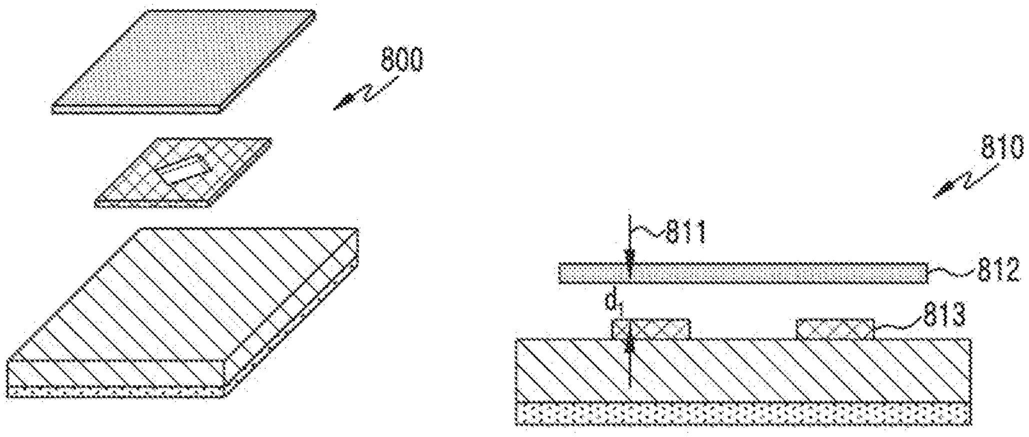
FIG. 8A illustrates a configuration of an antenna in which an interval between patches of the antenna decreases according to an embodiment of the disclosure.
Figure 8B:
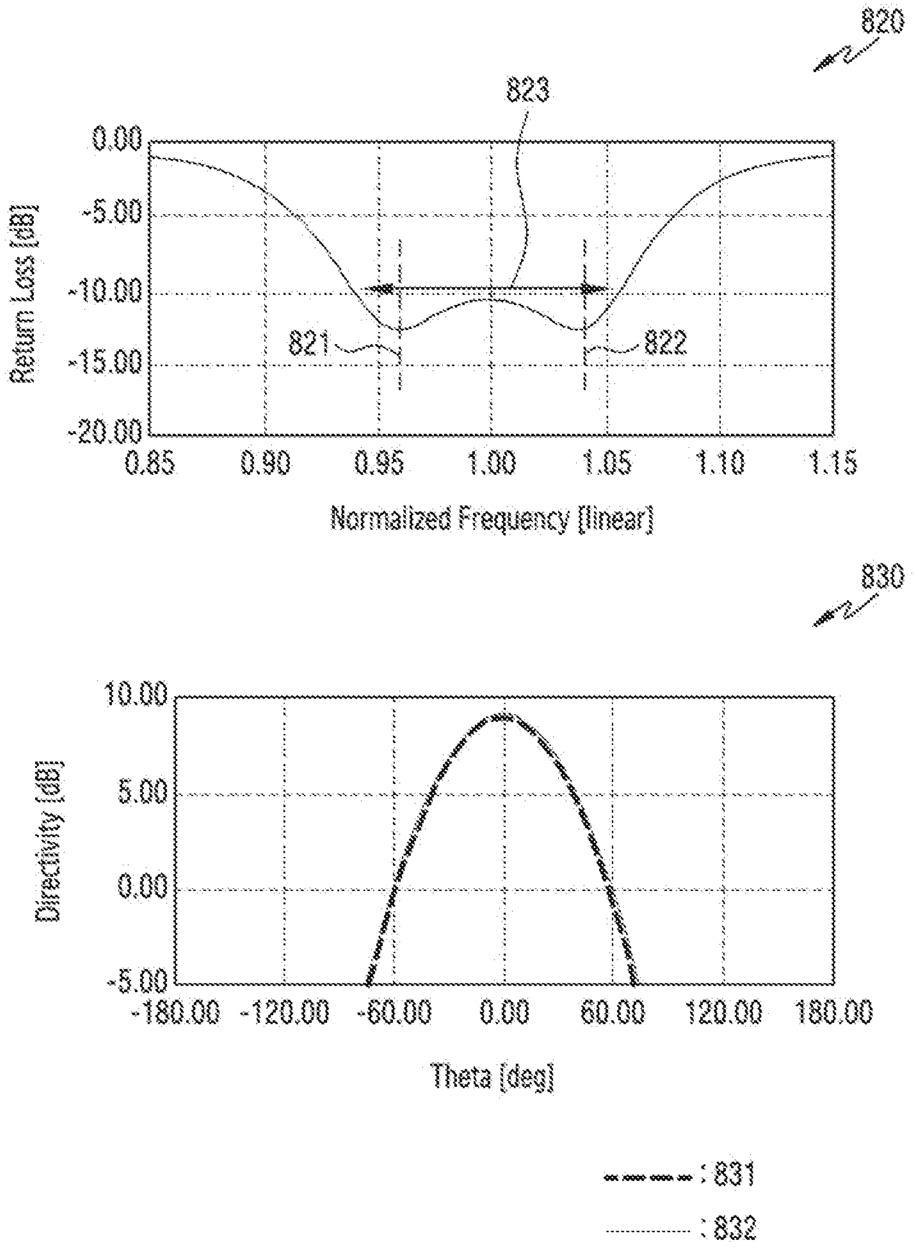
FIG. 8B illustrates antenna performance according to decrease in interval between patches of an antenna according to an embodiment of the disclosure.

FIG. 8A illustrates a configuration of an antenna in which an interval between patches of the antenna decreases according to an embodiment of the disclosure. FIG. 8B illustrates antenna performance according to decrease in interval between patches of an antenna according to an embodiment of the disclosure. In an electronic device 800 of FIG. 8A, a substrate structure is formed to have a flat form including a ground as the structure of FIG. 7. The sizes of a metal patch at the upper end part and a metal patch at the lower end part are the same as those of the electronic device 700 of FIG. 7. The metal patch at the lower end part may include an opening.

Referring to FIG. 8A, the stacked patch antenna 810 (including the metal patch at the lower end part including the opening) may have an interval 811 between an upper metal patch 812 (at the upper end part) and a lower metal patch 813 (at the lower end part). In this case, the interval may be formed to have a length of $d_1$ identical to the reduced interval 711 of the regular stacked patch antenna 710 of FIG. 7B. For example, when a wavelength of a signal to be radiated from the antenna is λ, $d_1$ may be formed to have a length of λ/24-λ/20. According to an embodiment, the lower metal patch 813 at the lower end part may include the opening as the first metal patch 330 of FIG. 5.

FIG. 8B depicts a third graph 820 indicating return loss of the stacked patch antenna 810 including the metal patch at the lower end part including the opening and a fourth graph 830 indicating directivity. In the third graph 820, the x-axis represents a normalized frequency and the y-axis represents return loss. The third graph 820 indicates a radiation band with respect to the stacked patch antenna 810, a first resonance frequency 821 may be formed to be about 0.95, and the second resonance frequency 822 may be formed to be about 1.05. Accordingly, since an interval between the first resonance frequency 821 and the second resonance frequency 822 is narrow and return loss in each resonance frequency band has a value of about −13 dB, a resonance band 823 formed based on a return loss value of −10 dB may be formed.

In the fourth graph 830, the x-axis represents an angle (theta) of a signal radiated from the antenna and the y-axis represents directivity. Referring to the fourth graph 830, a graph 831 indicating directivity with respect to the regular stacked patch antenna 710 in FIG. 7A and a graph 832 indicating directivity with respect to the stacked patch antenna 810 including the metal patch at the lower end part including the opening are depicted.

According to an embodiment, the directivity with respect to the regular stacked patch antenna 710 having an interval of $d_0$ and the directivity with respect to the stacked patch antenna 810 including the metal patch at the lower end part including the opening and having an interval of $d_1$ may be formed to be the same. Therefore, the stacked patch antenna according to an embodiment of the disclosure may secure a radiation band while allowing a signal radiated from the antenna to maintain the same directivity as before even if the interval is reduced.

Hereinafter, as described above, the cause of a widening of the resonance frequency interval when the interval between the metal patch at the upper end part and the metal patch at the lower end part becomes narrow will be described and a reason why the radiation band may be secured while maintaining the same directivity by using the stacked patch antenna according to an embodiment of the disclosure will be described.

Figure 9A:
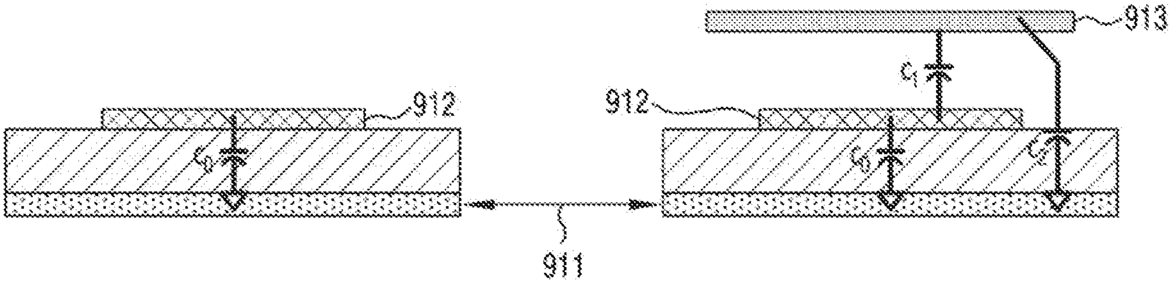
FIG. 9A to FIG. 9B illustrate a configuration of a capacitor between patches according to addition of a metal patch to an antenna according to an embodiment of the disclosure.
Figure 9B:
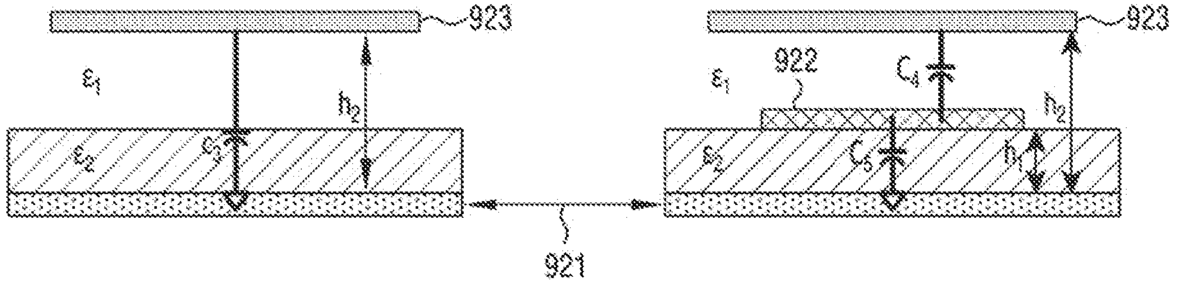
Figure 9C:
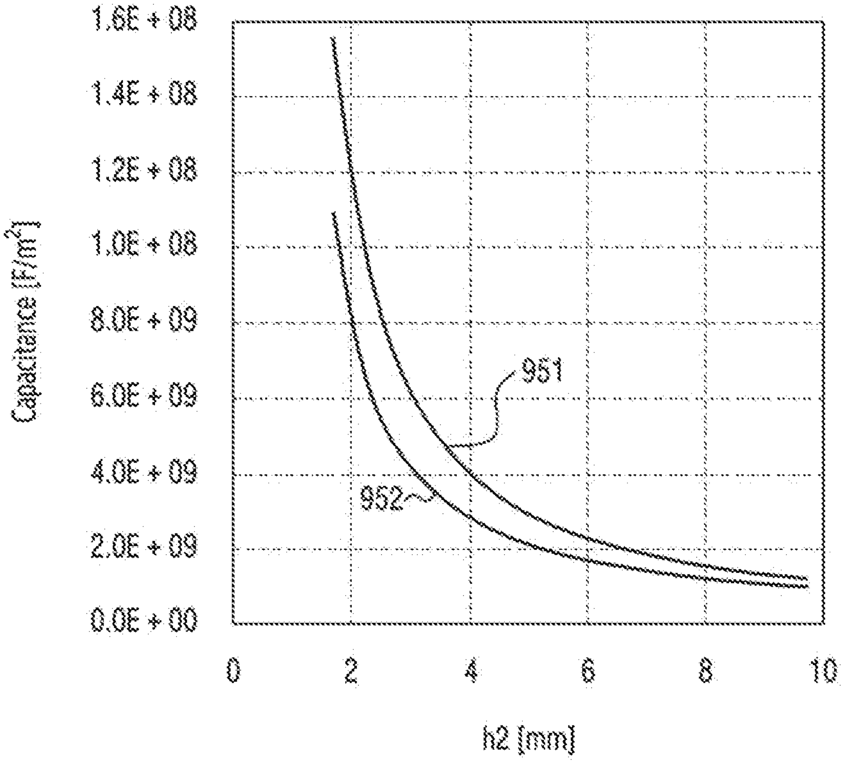
FIG. 9C is a graph indicating a capacitance according to addition of a metal patch to an antenna according to an embodiment of the disclosure.

FIG. 9A to FIG. 9B illustrate a configuration of a capacitor between patches according to addition of a metal patch to an antenna according to an embodiment of the disclosure. FIG. 9C is a graph indicating a capacitance according to addition of a metal patch to an antenna according to an embodiment of the disclosure. FIG. 9A to FIG. 9B illustrate that the metal patch at the upper end part and the metal patch at the lower end part may have the same area and the metal patch at the lower end part does not include an opening.

Referring to FIG. 9A, in order to describe a change in resonance frequency generated by feeding the metal patch 912 at the lower end part according to addition of the metal patch 913 to the upper end part, a substrate including the metal patch 912 at the lower end part and a ground area 911 is shown in a left part of the drawing and a substrate including the metal patch 912 at the lower end part and a ground area 911 and the metal patch 913 at the upper end part are shown in a right part of the drawing.

Referring to the left part of FIG. 9A, a first capacitor $C_0$ may be formed by the metal patch 912 at the lower end part and the ground area 911 of the substrate. Here, a relationship between the first capacitor and a first resonance frequency $f_{r1}$ generated by feeding the metal patch 913 at the lower end part is as shown in <Equation 1> below.

$$f_{r_1} \sim \frac{1}{\sqrt{C_0}} \quad \text{[Equation 1]}$$

In Equation 1, $f_{r1}$ indicates a first resonance frequency generated by feeding the metal patch 912 at the lower end part, and $C_0$ indicates a first capacitor generated between the metal patch 912 at the lower end part and the ground area 911 of the substrate.

Considering the above-described equation, the first resonance frequency $f_{r1}$ generated by feeding the metal patch 912 at the lower end part may be inversely proportional to the first capacitor $C_0$ generated between the metal patch 912 at the lower end part and the ground area 911 of the substrate.

On the other hand, referring to the right part of the drawing, in case of adding the metal patch 913 to the upper end part, in addition to the first capacitor $C_0$ between the metal patch 912 at the lower end part and the ground area 911 of the substrate, a second capacitor $C_1$ between the metal patch 912 at the lower end part and the metal patch 913 at the upper part and a third capacitor $C_2$ between the metal patch 913 at the upper part and the ground area 911 of the substrate may be formed. Here, a relationship between the first capacitor to the third capacitor and a first resonance frequency $f_{r1}$ generated by feeding the metal patch 912 at the lower end part is as shown in <Equation 2> below.

$$f_{r_1'} \sim \frac{1}{\sqrt{C_0 + (C_1 \| C_2)}} \quad \text{[Equation 2]}$$

In Equation 2, $f_{r1}$ indicates a first resonance frequency generated by feeding the metal patch 912 at the lower end part when the metal patch 913 is added to the upper end part. $C_0$ indicates a first capacitor generated between the metal patch 912 at the lower end part and the ground area 911 of the substrate. $C_1$ indicates a second capacitor generated between the metal patch 912 at the lower end part and the metal patch 913 at the upper end part. $C_2$ indicates a third capacitor generated between the metal patch 913 at the upper end part and the ground area 911 of the substrate.

Considering the above described equation, since a parallel sum of the second capacitor $C_1$ and the third capacitor $C_2$ may have a value larger than zero, the first resonance frequency $f_{r1}$ when the metal patch 913 is added to the upper end part has a value smaller than that the first resonance frequency $f_{r1}$ of otherwise.

Referring to FIG. 9B, in order to describe a change in resonance frequency generated by feeding the metal patch 923 at the upper end part according to addition of the metal patch 922 to the lower end part, a substrate including the metal patch 923 at the upper end part and a ground area 921 is shown in a left part of the drawing and a substrate including the metal patch 923 at the upper end part, the metal patch 922 at the lower end part, and a ground area 921 is shown in a right part of the drawing.

Referring to the left part of FIG. 9, a fourth capacitor $C_3$ may be formed by the metal patch 923 at the upper end part and the ground area 921 of the substrate. Here, a relationship between the fourth capacitor and a second resonance frequency $f_{r2}$ generated by feeding the metal patch 923 at the upper end part is as shown in <Equation 3> below.

$$F_{r_2} \sim \frac{1}{\sqrt{C_3}} \quad \text{[Equation 3]}$$

In Equation 3, $f_{r2}$ indicates a second resonance frequency generated by feeding the metal patch 923 at the upper end part, and $C_3$ indicates a fourth capacitor generated between the metal patch 923 at the upper end part and the ground area 921 of the substrate.

In Equation 3, the second resonance frequency $f_{r2}$ generated by feeding the metal patch 923 at the upper end part may be inversely proportional to the fourth capacitor $C_3$ generated between the metal patch 923 at the upper end part and the ground area 921 of the substrate.

On the other hand, referring to the right part of the drawing, in case of adding the metal patch 922 to the lower end part, a fifth capacitor $C_4$ between the metal patch 922 at the lower end part and the metal patch 923 at the upper part and a sixth capacitor $C_5$ between the metal patch 922 at the lower part and the ground area 921 of the substrate may be formed. Here, a relationship of the fifth capacitor and the sixth capacitor and the third capacitor to a second resonance frequency $f_{r2}$ generated by feeding the metal patch 923 at the upper end part is as shown in <Equation 4> below.

$$f_{r_2'} \sim \frac{1}{\sqrt{C_4 \| C_5)}} \quad \text{[Equation 4]}$$

In Equation 4, $f_{r2}$ indicates a second resonance frequency generated by feeding the metal patch 923 at the upper end part when the metal patch 922 is added to the lower end part, $C_4$ indicates a fifth capacitor generated between the metal patch 923 at the upper end part and the metal patch 922 at the lower end part and $C_5$ indicates a sixth capacitor generated between the metal patch 922 at the lower end part and the ground area 921 of the substrate.

In Equation 4, to compare changes according to addition of the metal patch 922 to the lower end part with respect the second resonance frequency generated by feeding the metal patch 923 at the upper end part, a size comparison of a parallel sum of the fifth capacitor $C_4$ and the sixth capacitor $C_5$ compared to the fourth capacitor $C_3$ may be required. Furthermore, the fourth capacitor to the sixth capacitor may be defined by <Equation 5> below for the size comparison.

$$C = \varepsilon \frac{A}{d} \quad \text{[Equation 5]}$$

In Equation 5, C indicates a capacitance between metal patches, indicates a permittivity of a space between metal patches, A indicates areas of metal patches, and d indicates intervals between metal patches.

With respect to Equation 5 and FIG. 9B, a capacitance of the fourth capacitor is as shown in <Equation 6> below.

$$C_3 = \varepsilon_1 \frac{A}{h_2} \quad \text{[Equation 6]}$$

In Equation 6, $C_3$ indicates a capacitance of the fourth capacitor, $\varepsilon_1$ indicates an effective permittivity in an environment in which a permittivity $\varepsilon_0$ of a space between the metal patch 923 at the upper end part and the metal patch 922 at the lower end part and a permittivity $\varepsilon_2$ of the substrate coupled to the metal patch 922 at the lower end part are mixed, A indicates areas of the metal patch 923 at the upper end part and the metal patch 922 at the lower end part, and $h_2$ indicates an interval between the metal patch 923 at the upper part and the ground area 911 of the substrate.

Furthermore, with respect to Equation 6 and FIG. 9B, a capacitance by a parallel sum of the fifth capacitor and the sixth capacitor is as shown in <Equation 7> below.

$$C_4 \| C_5 = \left(\varepsilon_2 \frac{A}{h_1}\right) \Big\| \left(\varepsilon_0 \frac{A}{h_2 - h_1}\right) \quad \text{[Equation 7]}$$

In Equation 7, $C_4$ indicates a capacitance of the fifth capacitor, $C_5$ indicates a capacitance of the sixth capacitor, $\varepsilon_2$ indicates a permittivity of the substrate coupled to the metal patch 922 at the lower end part, $\varepsilon_0$ indicates a permittivity of a space between the metal patch 923 at the upper end part and the metal patch 922 at the lower end part, A indicates areas of the metal patch 923 at the upper end part and the metal patch 922 at the lower end part, $h_1$ indicates an interval between the metal patch 922 at the lower end part and the ground area 911 of the substrate, and $h_2$ indicates an interval between the metal patch 923 at the upper end part and the ground area 911 of the substrate.

Referring to FIG. 9C for size comparison of the above-described equation (Equation 7), a fifth graph 951 of FIG. 9C indicates a capacitance change of the fourth capacitor depending on $h_2$ when $h_1$ is fixed. A sixth graph 952 indicates a capacitance change of a parallel sum of the fifth capacitor and the sixth capacitor depending on $h_2$ when $h_1$ is fixed.

Referring to the fifth graph 951 and the sixth graph 952, regardless of a value of $h_2$, a capacitance of the sixth graph 952 may be formed lower than a capacitance of the fifth graph 951. According to an embodiment, a capacitance according to a parallel sum of the fifth capacitor and the sixth capacitor may be formed lower than a capacitance of the fourth capacitor.

According to another embodiment, even if a value of $h_1$ is changed, a capacitance of the sixth graph 952 may be formed lower than a capacitance of the fifth graph 951. Accordingly, considering that a resonance frequency is inversely proportional to a capacitance, the second resonance $f_{r2}$ which may be generated by feeding the metal patch 923 at the upper end part may be formed lower than the second resonance frequency $f_{r2}$ which may be generated in case of adding the metal patch 932 to the lower end part.

In consideration of the description above, in case that, in a stacked patch antenna, an interval between a metal patch at the upper end part and a metal patch at the lower end part is reduced, a mutual capacitance loading effect between capacitances of the metal patches and a ground area of the stacked patch antenna occurs and an interval between generated resonance frequencies may increase.

On the contrary, the stacked patch antenna according to an embodiment of the disclosure may reduce a capacitance value of a capacitor through the opening of the metal patch at the lower end part and prevent an interval between generated resonance frequencies from increasing. For example, considering the above-described equations and FIG. 9A, in case that an opening is included in the metal patch 912 at the lower end part, capacitances of the first capacitor $C_0$ and the second capacitor $C_1$ are reduced to prevent the first resonance frequency from decreasing.

For another example, considering the above-described equations and FIG. 9B, in case that an opening is included in the metal patch 922 at the lower end part, capacitances of the fifth capacitor $C_4$ and the sixth capacitor $C_5$ are reduced to prevent the second resonance frequency from increasing. That is, the stacked patch antenna according to an embodiment of the disclosure may maintain conventional antenna radiation performance even if the interval between two metal patches decreases.

Referring to FIG. 1 to FIG. 9C, by using a substrate formed of a dielectric having a permittivity unlike a conventional printed circuit board (PCB), the electronic device according to an embodiment of the disclosure may form the substrate having a support structure and may be coupled to metal patches in a fusion or assembling manner or the like through the substrate. Therefore, when configuring a stacked patch antenna, an additional process or an external structure may not be required.

The electronic device according to an embodiment of the disclosure is more practical compared to using of a conventional PCB. For example, compared to using of a conventional PCB, the electronic device including a substrate formed of a dielectric having a permittivity is practical in that the electronic device may be produced at low production costs. For another example, the electronic device according to an embodiment of the disclosure may include a substrate configured by a dielectric having good moldability and the substrate may include a support structure to be coupled to a metal patch. As such, an antenna (or antenna element) having a small volume may be formed and more antennas may be mounted on one MMU, thus more practical than a method for forming an antenna by using a conventional PCB.

For still another example, the electronic device according to an embodiment of the disclosure may maintain the same antenna radiation performance (e.g., directivity and a radiation band) as before in spite of an antenna structure occupying a small volume through the opening included in the metal patch at the lower end part.

FIG. 3 to FIG. 9 describe one antenna structure including antenna elements, a MMU device in which multiple subarrays are combined to form one piece of equipment may be understood as an embodiment of the disclosure as well. Hereinafter, an example of an electronic device to which an antenna structure including a substrate formed of a dielectric according to an embodiment of the disclosure and a metal patch including an opening is mounted will be described with reference to FIG. 10.

Figure 10:
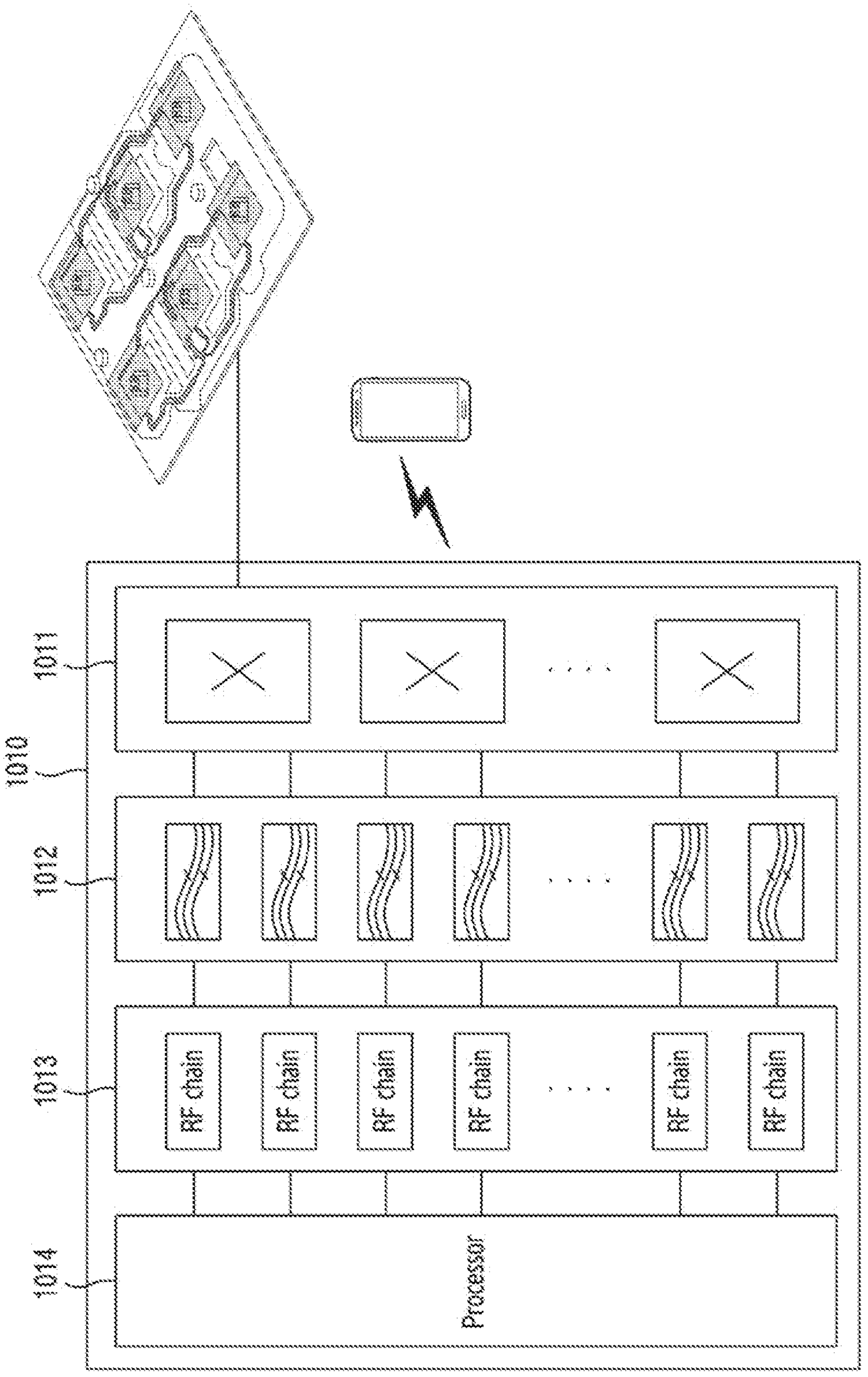
FIG. 10 illustrates a functional configuration of an electronic device according to one or more embodiments of the disclosure.

FIG. 10 illustrates a functional configuration of an electronic device according to one or more embodiments of the disclosure. The electronic device 1010 may correspond to one of the base station 100 or the terminal 110-1 to 110-6 in FIG. 1. According to an embodiment, the electronic device 1010 may be an MMU. The embodiments of the disclosure include the antenna element structure mentioned with reference to FIG. 1 to FIG. 9 as well as the electronic device including the antenna element structure.

FIG. 10 illustrates an exemplary functional configuration of the electronic device 1010. The electronic device 1010 may include an antenna unit 1011, a filter unit 1012, a radio frequency (RF) processor 1013, and a controller (a processor) 1014.

The antenna unit 1011 (or, antenna circuit) may include multiple antennas. The antenna performs functions for transmitting or receiving a signal through a wireless channel. The antenna may include a radiator formed of a conductive pattern or a conductor formed on a substrate (e.g., a PCB). The antenna may radiate an up-converted signal on a wireless channel or obtain a signal radiated by other devices. Each antenna may be referred to as an antenna element or an antenna component. In some embodiments, the antenna unit 1011 may include an antenna array in which multiple antenna elements form an array (e.g., a sub array). The antenna unit 1011 may be electrically connected to the filter unit 1012 through RF signal lines. The antenna unit 1011 may be mounted on a PCB including multiple antenna elements. The PCB may include multiple RF signal lines for connecting each antenna element and the filter unit 1012. The RF signal lines may be referred to as feeding networks. The antenna unit 1011 may provide a received signal to the filter unit 1012 or radiate a signal provided by the filter unit 1012 into the air.

The antenna unit 1011 according to one or more embodiments may include at least one antenna module having a dual polarization antenna. The dual polarization antenna may be, for example, a cross-pol (x-pol) antenna. The dual polarization antenna may include two antenna elements corresponding to different polarizations. For example, the dual polarization antenna may include a first antenna element having a polarization of +45° and a second antenna element having a polarization of −45°. The polarizations may surely be formed in other polarization orthogonal to each other than +45° and −45°. Each antenna element may be connected to a feeding line and may be electrically connected to a filter unit 1012, a RF processor 1013, and a controller (a processor) 1014 to be described below.

According to an embodiment, the dual polarization antenna may correspond to a patch antenna (or microstrip antenna). When having a patch form, the dual polarization antenna may be easily implemented and integrated into an array antenna. Two signals having different polarizations may be input to each antenna port. Each antenna port may correspond to an antenna element. Optimization of a relationship between a co-pol property and a cross-pol property of two signals having different polarizations is required for high efficiency. In the dual polarization antenna, the co-pol property indicates a property with respect to a specific polarization and the cross-pol property indicates a property with respect to a polarization different from the specific polarization.

An antenna element and a sub array (e.g., FIG. 3A) formed in the structure according to an embodiment of the disclosure may be included in the antenna unit 1011 of FIG. 10. That is, the stacked patch antenna including the substrate having a support structure formed of a dielectric and the metal patch including an opening may form each antenna element and multiple antenna elements may form a sub array as shown in FIG. 3A and FIG. 3B. The antenna element and the sub array may be included in the antenna unit 1011.

The filter unit 1012 may perform filtering for transferring a signal of a desired frequency. The filter unit 1012 may perform a function to selectively identify a frequency by generating a resonance. In some embodiments, the filter unit 1012 may form a resonance through a cavity structurally including a dielectric. In some embodiments, the filter unit 1012 may form a resonance through elements configured to form an inductance or a capacitance. In some embodiments, the filter unit 1012 may include an elastic filter, such as a bulk acoustic wave (BAW) filter or a surface acoustic wave filter (SAW). The filter unit 1012 may include at least one of a band pass filter, a low pass filter, a high pass filter, or a band reject filer. That is, the filter unit 1012 may include RF circuits for obtaining signals in a frequency band for transmission or a frequency band for reception. The filter unit 1012 according to one or more embodiments may electrically connect the antenna unit 1011 and the RF processor 1013.

The RF processor 1013 may include multiple RF paths. An RF path may be a unit of path through which a signal received through an antenna or a signal radiated through an antenna passes. At least one RF path may be referred to as an RF chain. The RF chain may include multiple RF elements. The RF elements may include an amplifier, a mixer, an oscillator, a DAC, an ADC, and the like. For example, the RF processor 1013 may include an up converter for up-converting a digital transmission signal in a base band into a transmission frequency and a digital-to-analog converter for converting an up-converted digital transmission signal into an analog RF transmission signal. The up converter and the DAC form a portion of a transmission path. The transmission path may further include a power amplifier (PA) or a coupler (or combiner). In addition, for example, the RF processor 1013 may include an analog-to-digital converter (ADC) for converting an analog RF reception signal into a digital reception signal and a down converter for down-converting a digital reception signal into a digital reception signal in a ground band. The ADC and the down converter form a portion of a reception path. The reception path may further include a low-noise amplifier (LNA) or a coupler (or divider). RF components of the RF processor may be implemented on a PCB. The base station 1010 may include a structure in which the antenna unit 1011, the filter unit 1012, and the RF processor 1013 are sequentially stacked. Antennas and RF components of the RF processor may be implemented on a PCB and PCBs and filters between PCBs may be repeatedly coupled to each other to form multiple layers.

The processor 1014 may control general operations of the electronic device 1010. The processor 1014 may include various modules for performing communication. The processor 1014 may include at least one processor such as a modem. The processor 1014 may include modules for digital signal processing. For example, the processor 1014 may include a modem. When transmitting data, the processor 1014 may generate complex symbols by coding and modulating a transmission bit stream. In addition, for example, when data is received, the processor 1014 may restore a bit stream by demodulating and decoding a baseband signal. The processor 1014 may perform functions of a protocol stack required by a communication standard.

In FIG. 10, a functional configuration of the electronic device 1010 is described as equipment for which the antenna structure of the disclosure may be utilized. However, the example shown in FIG. 10 is merely an exemplary configuration for the utilization of the antenna structure according to one or more embodiments of the disclosure described through FIG. 1 to FIG. 9C, and the embodiments of the disclosure are not limited to the components of the equipment shown in FIG. 10. Accordingly, an antenna module including an antenna structure, other type of communication equipment, and an antenna structure itself may also be understood as embodiments of the disclosure.

As described above, an antenna in a wireless communication system according to an embodiment of the disclosure may include a substrate including a first metal patch, a second metal patch, a feeding circuit, and a support structure, wherein the first metal patch and the second metal patch are disposed on the substrate, the feeding circuit is coupled to the substrate while being spaced apart from the first metal patch, and the first metal patch includes an opening.

In an embodiment, the substrate including the support structure may include a first support to be coupled to the second metal patch, a second support to be coupled to the first metal patch, and a third support to be coupled to the feeding circuit.

In an embodiment, the first support may be disposed at the center of the substrate having the support structure, the second support may be disposed spaced apart from the first support, the third support may be disposed extending from the first support, the first metal patch may extend through the first support through an opening of the first metal patch to be coupled to the second support, and the second metal patch may be coupled to the first support while being spaced apart from the first metal patch.

In an embodiment, the second metal patch may be coupled to the first support on at least one point of the second metal patch, and the first metal patch may be coupled to the second support on at least one point of the first metal patch.

In an embodiment, the second metal patch may be coupled to the first support at the center of the second metal patch.

In an embodiment, the first metal patch may be coupled to the first support on an edge of the first metal patch.

In an embodiment, the coupling may be performed by fusion or assembling.

In an embodiment, the substrate having the support structure may be formed of a dielectric having a permittivity.

In an embodiment, a relative permittivity of the dielectric may correspond to about 2 or more and about 6 or less.

In an embodiment, feeding of the feeding circuit may be performed through coupling feeding.

In an embodiment, the feeding of the feeding circuit may include first feeding and second feeding, and when a phase of the first feeding is a first phase and a phase of the second feeding is a second phase, a difference between the first phase and the second phase may correspond to 90°.

In an embodiment, a ground area disposed adjacent to one surface of the substrate having the support structure may be further included.

In an embodiment, the substrate having the support structure may including a ground area.

In an embodiment, a first capacitor may be formed by the first metal patch and the second metal patch, a second capacitor may be formed by the first metal patch and the ground area, and a third capacitor may be formed by the second metal patch and the ground area.

In an embodiment, by the feeding of the feeding circuit, a first resonance frequency may be formed along a first current path via the first capacitor, the second capacitor, and the third capacitor, and a second resonance frequency may be formed along a second current path via the first capacitor and the second capacitor.

In an embodiment, multiple metal patches arranged spaced apart from the first metal patch and the second metal patch may be further included.

As described above, a MMU device according to an embodiment of the disclosure may include a feeding circuit, a substrate having a support structure, at least one processor, and a sub array including multiple antenna elements, wherein each of the antenna elements includes a first metal patch disposed on the substrate having the support structure and having an opening, and a second metal patch disposed on the substrate having the support structure while being spaced apart from the first metal patch, and the feeding circuit is disposed on the substrate having the support structure while being spaced apart from the first metal patch.

According to an embodiment, the substrate having the support structure may be formed in a pattern structure corresponding to each of the antenna elements, and the pattern structure may include a first support disposed at the center of each of the antenna elements, a second support disposed spaced apart from the first support, and a third support disposed extending from the first support.

In an embodiment, the feeding circuit may be coupled to the third support of the pattern structure, the first metal patch may extend through the first support through an opening of the first metal patch to be coupled to the second support, and the second metal patch may be coupled to the first support while being spaced apart from the first metal patch.

According to an embodiment, the first metal patch may be coupled to the second support on an edge of the first metal patch and the second metal patch may be coupled to the first support at the center of the second metal patch.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to one or more embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation, and the disclosure is not limited by elements expressed in the singular or the plural. Therefore, either an element expressed in the plural may also include a single element or an element expressed in the singular may also include multiple elements.

Specific embodiments have been described in the detailed description of the disclosure. Various modifications and changes may be made thereto without departing from the scope of the disclosure. Therefore, the scope of the disclosure should not be defined as being limited to the embodiments, but should be defined by the appended claims and equivalents thereof.

What is claimed is:

1. An antenna in a wireless communication system, the antenna comprising:

a first metal patch including an opening;

a second metal patch;

a feeding line; and a substrate including a support structure including a first support portion for the second metal patch, a plurality of second support portions for the first metal patch, and a third support portion disposed between the plurality of second support portions, wherein the first support portion is coupled with the second metal patch via the opening of the first metal patch, wherein the plurality of second support portions are coupled with the first metal patch, and wherein the feeding line is coupled with the third support portion disposed between the plurality of second support portions such that the feeding line is spaced apart from the first metal patch.

2. The antenna of claim 1, wherein the first support portion is disposed at a center of the substrate including the support structure, wherein the plurality of second support portions are spaced apart from the first support portion, wherein the third support portion is disposed to extend from the first support portion, and wherein the second metal patch is coupled to the first support portion and spaced apart from the first metal patch.

3. The antenna of claim 1, wherein the second metal patch is coupled to the first support portion on at least one point of the second metal patch, and wherein the first metal patch is coupled to the plurality of second support portions on at least one point of the first metal patch.

4. The antenna of claim 3, wherein the first metal patch is coupled to the first support portion on an edge of the first metal patch.

5. The antenna of claim 1, wherein the second metal patch is coupled to the first support portion at a center of the second metal patch.

6. The antenna of claim 1, wherein the substrate including the support structure is formed of a dielectric having a permittivity.

7. The antenna of claim 1, wherein the feeding line includes a first feeding line and a second feeding line, and wherein a first phase of a first signal of the first feeding line is different from a second phase of a second signal of the second feeding line by 90°.

8. The antenna of claim 1, further comprising:

a ground area disposed adjacent to a surface of the substrate including the support structure.

9. The antenna of claim 1, wherein the substrate comprises a ground area, wherein a first capacitor is formed by the first metal patch and the second metal patch, wherein a second capacitor is formed by the first metal patch and the ground area, and wherein a third capacitor is formed by the second metal patch and the ground area.

10. The antenna of claim 9, wherein, by feeding of the feeding line, a first resonance frequency is formed along a first current path via the first capacitor, the second capacitor, and the third capacitor, and a second resonance frequency is formed along a second current path via the first capacitor and the second capacitor.

* * * * *